(12) United States Patent
Sano

(10) Patent No.: US 12,279,039 B2
(45) Date of Patent: Apr. 15, 2025

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Toshiyuki Sano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 18/191,559

(22) Filed: Mar. 28, 2023

(65) Prior Publication Data
US 2023/0328365 A1   Oct. 12, 2023

(30) Foreign Application Priority Data
Apr. 6, 2022   (JP) .................................. 2022-063426

(51) Int. Cl.
| | |
|---|---|
| *H04N 23/60* | (2023.01) |
| *G06T 7/00* | (2017.01) |
| *G06T 7/42* | (2017.01) |
| *G06T 7/50* | (2017.01) |
| *G06T 7/60* | (2017.01) |
| *H04N 23/56* | (2023.01) |

(52) U.S. Cl.
CPC ............ *H04N 23/64* (2023.01); *G06T 7/0002* (2013.01); *G06T 7/42* (2017.01); *G06T 7/50* (2017.01); *G06T 7/60* (2013.01); *H04N 23/56* (2023.01); *G06T 2200/24* (2013.01); *G06T 2207/20068* (2013.01); *G06T 2207/20092* (2013.01)

(58) Field of Classification Search
CPC ...... H04N 23/56; H04N 23/64; G06T 1/0007; G06T 7/0002; G06T 7/40; G06T 7/41; G06T 7/42; G06T 7/50; G06T 7/529; G06T 7/60; G06T 2200/24; G06T 2207/20068; G06T 2207/20092
See application file for complete search history.

(56) References Cited

U.S. PATENT DOCUMENTS

2017/0270655 A1* 9/2017 Watanabe .............. G01N 21/57

FOREIGN PATENT DOCUMENTS

JP            2017173300 A        9/2017

* cited by examiner

*Primary Examiner* — Daniel M Pasiewicz
(74) *Attorney, Agent, or Firm* — Canon U.S.A., Inc., IP Division

(57) ABSTRACT

An evaluation value for evaluating an object surface state is calculated in a more suitable form. An image processing apparatus acquires distance information about a distance between an image capturing apparatus and a subject, acquires image capturing apparatus information about the image capturing apparatus, and calculates a geometric condition on a positional relationship between a light source, the subject, and the image capturing apparatus based on the distance information and the image capturing apparatus information.

14 Claims, 23 Drawing Sheets

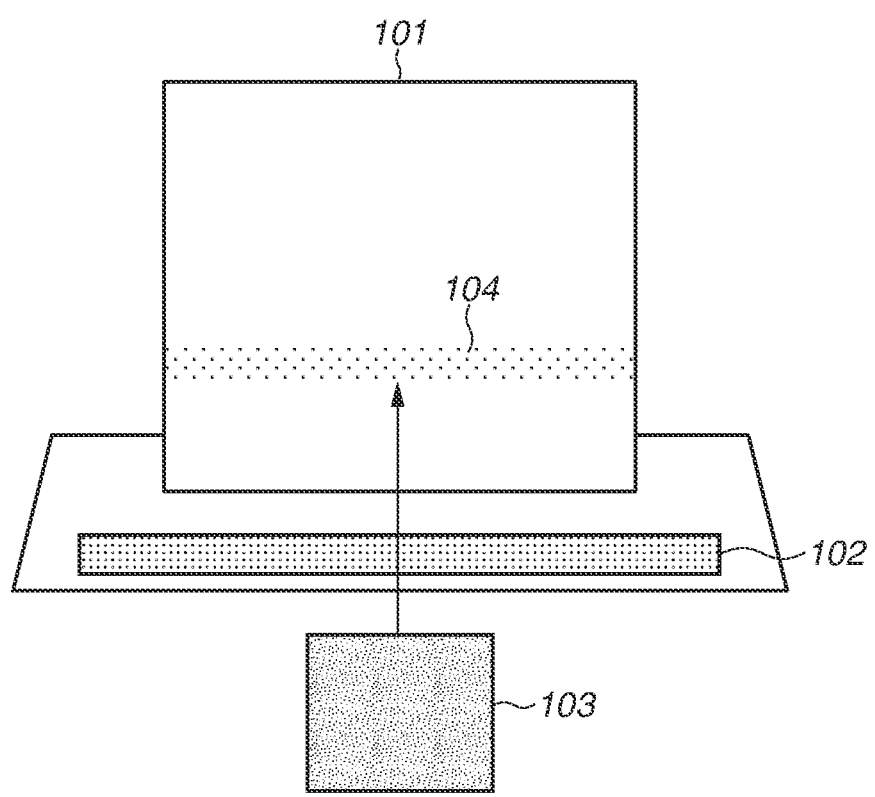

CASE WHERE DISTANCE BETWEEN SUBJECT AND CAMERA IS SHORT

CASE WHERE DISTANCE BETWEEN SUBJECT AND CAMERA IS LONG

FIG.8

|  | INTEGRAL RANGE | |
| --- | --- | --- |
|  | MINIMUM WAVELENGTH | MAXIMUM WAVELENGTH |
| EVALUATION VALUE 1 | f1 | f2 |
| EVALUATION VALUE 2 | f3 | f4 |
| EVALUATION VALUE 3 | f5 | f6 |

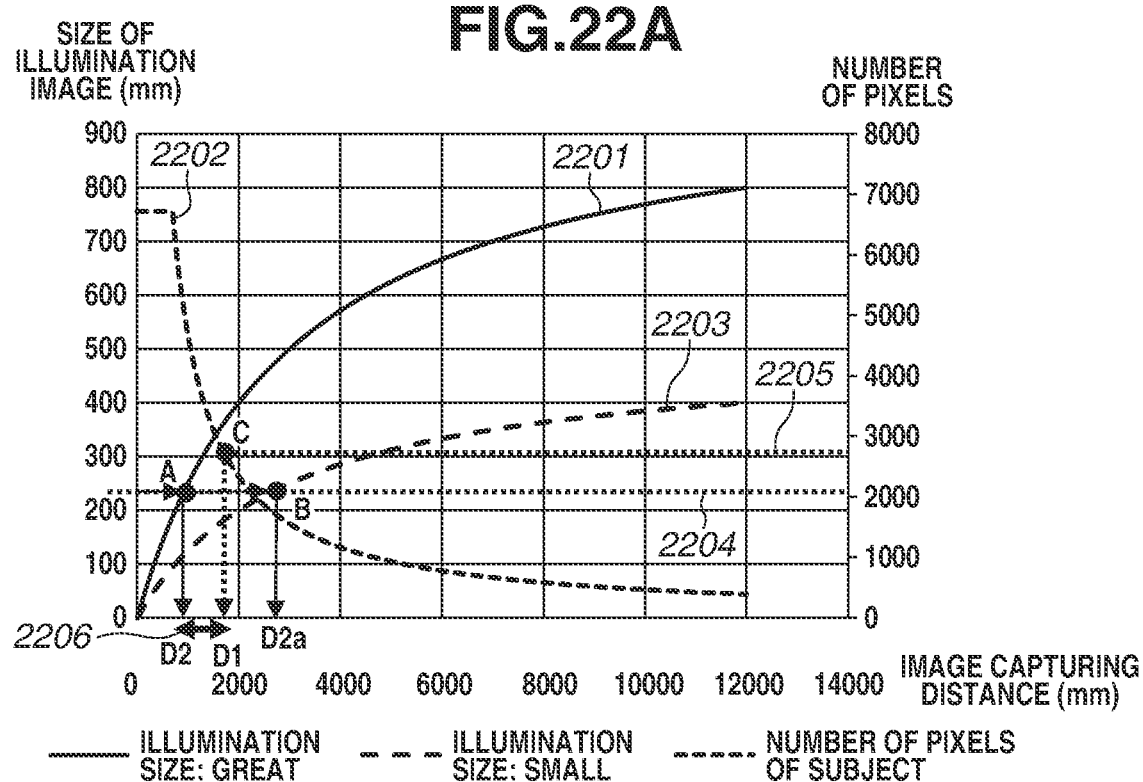
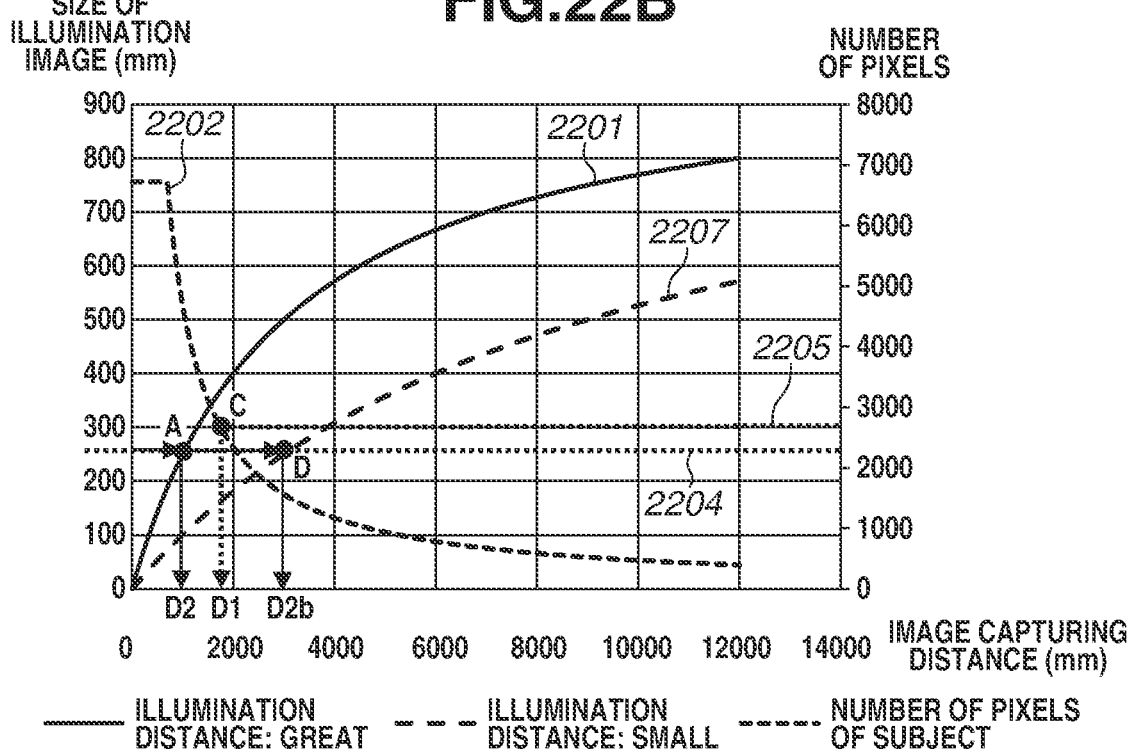

IMAGE PROCESSING APPARATUS, METHOD FOR CONTROLLING IMAGE PROCESSING APPARATUS, AND STORAGE MEDIUM

BACKGROUND

Field

The present disclosure relates to a process for evaluating an object surface state.

Description of the Related Art

In the field of industrial design, it is important to check an object surface state because the object surface state contributes to the quality of design. In a case where an automobile body has fine asperities due to uneven paint, a reflection image on the body is different from an expected reflection image on a smooth surface, and the quality of design may be degraded. A state of an object surface with fine asperities is referred to as orange peel. Japanese Patent Application Laid-Open No. 2017-173300 discusses a method for evaluating a state of an object surface including orange peel. In this method, spatial frequency characteristics of a reflected illumination image are calculated based on an image acquired by illuminating an object and imaging, and the surface state of the object is evaluated based on the spatial frequency characteristics and sensory evaluation information acquired in advance.

In calculating an evaluation value for evaluating an object surface state, different weights are defined for different spatial frequencies of a reflected illumination image, and a frequency band in performing integration is limited. Considering the foregoing characteristics, an image corresponding to an imaging result desirably includes an evaluation target spatial frequency component. Meanwhile, an illumination image reflected on a subject changes in actual size or pixel pitch depending on the distance between the subject and an image capturing apparatus in imaging. Thus, it is sometimes difficult for a user to determine whether a current image capturing distance is a distance from which an evaluation value is calculable.

SUMMARY

The present disclosure is directed to improving the calculation of an evaluation value for evaluating the state of a surface of an object.

According to an aspect of the present disclosure, an image processing apparatus includes a distance information acquisition unit configured to acquire distance information about a distance between a subject illuminated with light from a light source and an image capturing apparatus configured to image the subject, an image capturing apparatus information acquisition unit configured to acquire image capturing apparatus information about the image capturing apparatus, a geometric condition calculation unit configured to calculate a geometric condition on a positional relationship between the light source, the subject, and the image capturing apparatus based on the distance information and the image capturing apparatus information, and a display control unit configured to display guide information on the calculated geometric condition in a display region.

Further features of the present disclosure will become apparent from the following description of exemplary embodiments with reference to the attached drawings.

BRIEF DESCRIPTION OF THE DRAWINGS

FIG. 1 is a diagram illustrating an example of a subject surface evaluation method.

FIG. 8 is a diagram illustrating an example of surface quality evaluation value type information.

FIGS. 22A and 22B are diagrams illustrating an example of a relationship between an image capturing distance and an illumination image.

DESCRIPTION OF THE EMBODIMENTS

Figure 2A:
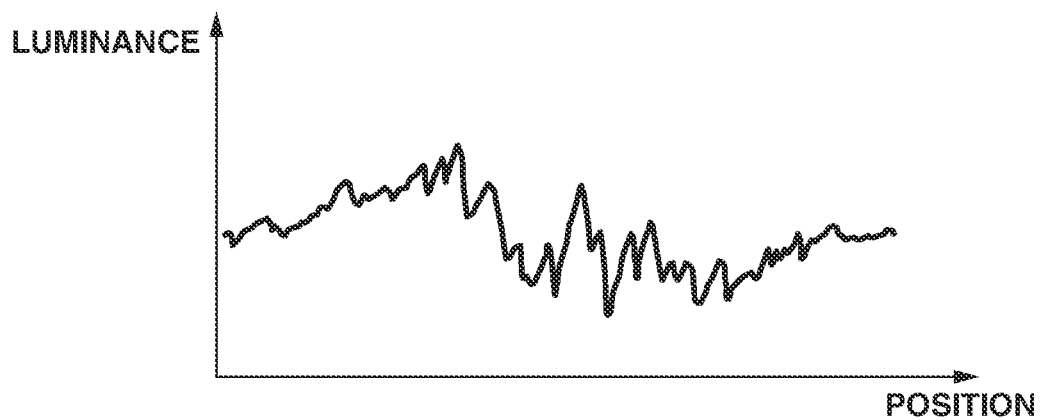
FIGS. 2A and 2B are diagrams illustrating an example of an optical profile and a spatial frequency component.

Various exemplary embodiments of the present disclosure will be described in detail below with reference to the attached drawings.

In the present specification and the drawings, components having substantially the same functional configuration are given the same reference numeral to omit redundant descriptions thereof.

An example of a system for evaluating a surface state of a subject according to a first exemplary embodiment of the present disclosure will be described below, focusing particularly on a case where a degree of surface asperities (i.e., surface roughness) of the subject is quantitatively evaluated.

(Brief Description of Evaluation Method)

An example of a method for evaluating a surface state of a subject (object) will be described briefly below with reference to FIG. 1 to FIG. 3D.

FIG. 1 illustrates an example of a method for imaging a subject to acquire an image for use in evaluating a surface state of the subject. An illumination 102 is situated at a position separated by a distance from a subject 101 being an evaluation target so that the illumination 102 is not in contact with the subject 101. According to the present exemplary embodiment, the illumination 102 is a linearly-formed light source. In the example illustrated in FIG. 1, part of light emitted from the illumination 102 is projected onto a surface of the subject 101, and an illumination image 104 is formed on the surface of the subject 101. According to the present exemplary embodiment, image data acquired by imaging the subject 101 with the illumination image 104 projected thereon using an image capturing apparatus 103 is used in evaluating the surface state of the subject 101.

In a case where the surface of the subject 101 is smooth, the illumination image 104 has linear edges. On the contrary, in a case where the surface of the subject 101 has asperities, the illumination image 104 has not linear but uneven edges. As described above, the unevenness of edges of the illumination image 104 varies according to the roughness (i.e., asperities) of the surface of the subject 101. An image processing apparatus according to the present exemplary embodiment calculates luminance characteristics (hereinafter, also referred to as "optical profile") for each position in a space corresponding to an image capturing range using information about a neighborhood of edges of the illumination image 104 formed on the surface of the subject 101. Then, the image processing apparatus quantitatively evaluates a degree of the surface state of the subject 101 (more specifically, the state of surface asperities) using the optical profile calculation result. Specifically, the image processing apparatus obtains a value by performing frequency analysis on the calculated optical profile and then integrating a predetermined frequency range of a frequency component (spatial frequency component) based on the frequency analysis result and determines the obtained value as an evaluation value for evaluating the surface state of the object. Hereinafter, the evaluation value is also referred to sometimes as "surface quality evaluation value" for convenience.

Figure 2B:
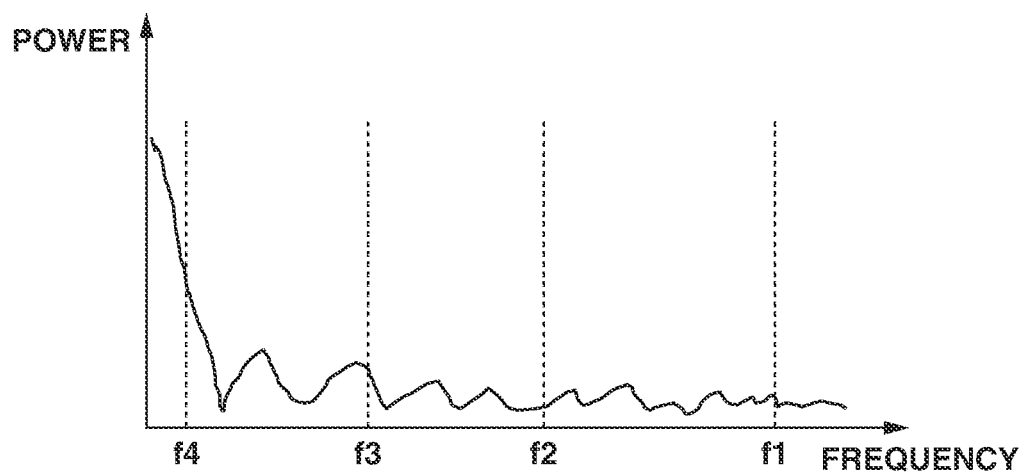

FIGS. 2A and 2B illustrate an example of an optical profile obtained from a positional relationship (hereinafter, also referred to as "geometric condition") between the subject 101, the illumination 102, and the image capturing apparatus 103 in FIG. 1 and an example of a spatial frequency component obtained by performing frequency analysis on the optical profile.

Specifically, FIG. 2A illustrates an example of an optical profile of a neighborhood of edges of the illumination image 104. In FIG. 2A, a horizontal axis represents positions in the space corresponding to the inside of the image capturing range, and a vertical axis represents luminances at the positions. In the example illustrated in FIG. 2A, the unevenness (i.e., fluctuation in luminance) corresponding to the level of surface asperities of the subject 101 is visualized.

Further, FIG. 2B illustrates a so-called power spectrum obtained by performing frequency conversion on the optical profile illustrated in FIG. 2A. In FIG. 2B, a horizontal axis represents frequencies, and a vertical axis represents powers. Since human visual characteristics vary in sensitivity to spatial frequency components with observation distance, frequency intervals to be integrated are preset as illustrated in FIG. 2B, and a degree of surface asperities of the object that varies with distance is calculated as a plurality of evaluation values.

In a case where the imaging is performed under the geometric condition as illustrated in FIG. 1, the subject 101 and the illumination image 104 reflected on the subject 101 in an image change in size with image capturing distance (i.e., distance between the image capturing apparatus 103 and the subject 101) of the image capturing apparatus 103.

Figure 3A:
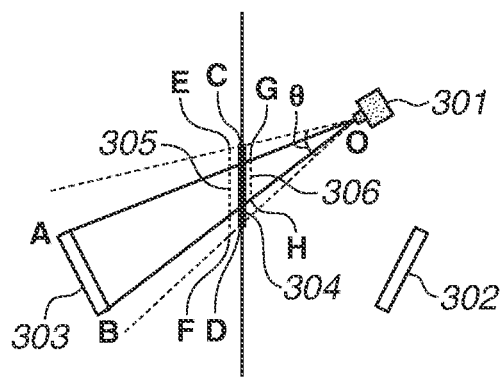
FIGS. 3A, 3B, 3C, and 3D are diagrams illustrating a relationship between a subject and an illumination image.
Figure 3B:
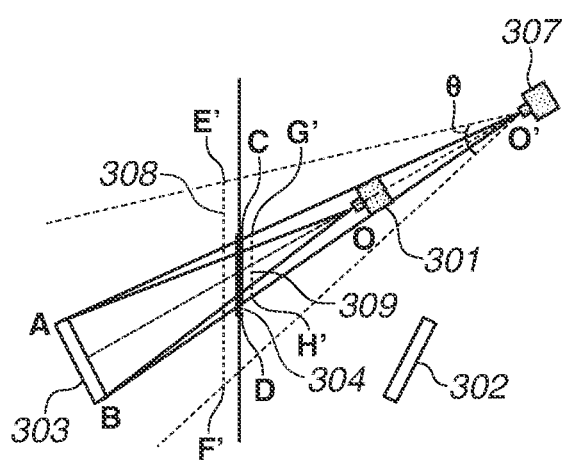

FIGS. 3A to 3D are diagrams schematically illustrating an example of a size relationship between the subject 101 and the illumination image 104 reflected on the subject 101 in an image. Specifically, FIG. 3A schematically illustrates a state where the distance between a subject and an image capturing apparatus is relatively short, whereas FIG. 3B schematically illustrates a state where the distance between the subject and the image capturing apparatus is longer than that in FIG. 3A.

FIG. 3A illustrates a state where an image capturing apparatus 301 images a subject 304. A size of an illumination 302 observed from the image capturing apparatus 301 at this time corresponds to an illumination image 306 in a case where a virtual image 303 of the illumination 302 is projected on the subject 304. Specifically, a size of the illumination image 306 is specified by a length of a line segment GH of intersection points where line segments OA and OB connecting a position O of an image sensor of the image capturing apparatus 301 and end points A and B of the illumination 302 intersect with a line segment CD connecting end points C and D of the subject 304. Further, at this time, the size of the subject 304 is constant whereas the number of pixels on an image is specified by a length of the line segment CD with respect to a line segment EF of intersection points where line segments (i.e., the number of horizontal pixels) defined by the point O and an angle of view θ intersect with the line segment CD including the subject plane. A region 305 specified by the line segment EF corresponds to an imaging target region (hereinafter, also referred to as "image capturing region") of the image capturing apparatus 301. Thus, in the case of the example illustrated in FIG. 3A, the subject 304 is imaged on the front with respect to the angle of view θ.

Figure 3C:
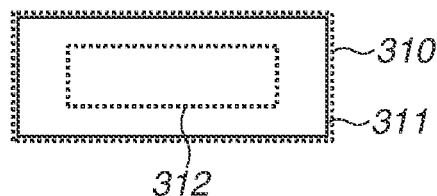

FIG. 3C illustrates an example of an image captured by the image capturing apparatus 301 under the geometric condition illustrated in FIG. 3A. A region 310 specified by a broken line indicates an image size corresponding to a result of imaging by the image capturing apparatus 301. Further, a region 311 specified by a solid line indicates a subject region. In the example illustrated in FIG. 3C, the subject 304 is imaged in the same size as the image size.

On the contrary, FIG. 3B illustrates a state where an image capturing apparatus 307 situated at a position O' farther from the subject 304 compared to the example illustrated in FIG. 3A images the subject 304. As in the example illustrated in FIG. 3A, an illumination image 309 in the example illustrated in FIG. 3B in a case where the image capturing apparatus 307 images the subject 304 is specified by a line segment G'H' obtained from intersection points where line segments O'A and O'B intersect with the line segment CD specified by the end points of the subject 304. At this time, the line segment G'H' is larger in length than the line segment GH in the example illustrated in FIG. 3A. This indicates that in general an illumination image observed from an image capturing apparatus increases in size at greater distances between the image capturing apparatus and a subject.

Meanwhile, in a case where the image capturing distance (distance between the subject 304 and the image capturing apparatus 301) increases, while the size of the subject 304 remains constant, the number of pixels of a subject region on an image based on an imaging result corresponds to the ratio of the subject 304 to an image capturing region 308 of the image capturing apparatus 307. Specifically, the relative length of the line segment G'H' with respect to a line segment E'F' corresponding to the number of horizontal pixels of the image capturing apparatus 307 corresponds to the number of pixels of the subject region on the image, and it is understood that the number of pixels is less than that in the example illustrated in FIG. 3A.

Figure 3D:
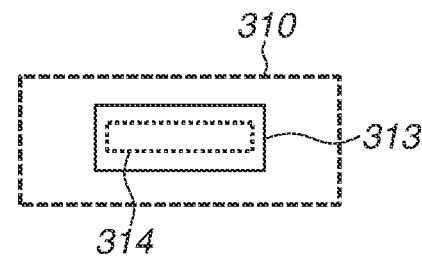

FIG. 3D illustrates an example of an image captured by the image capturing apparatus 307 under the geometric condition illustrated in FIG. 3B. A subject region 313 specified by a solid line is imaged with respect to the region 310 indicating the image size based on the result of imaging by the image capturing apparatus 301, and an illumination image 314 is further imaged in the subject region 313. At this time, there is a feature that while the illumination image 314 is greater in actual size than that in the example illustrated in FIG. 3C as described above, since the ratio of the size of the illumination image 314 to the angle of view decreases, the number of pixels of a region corresponding to the illumination image 314 on the image is less than that in the example illustrated in FIG. 3C.

As described above, in order to calculate a surface quality evaluation value, a spatial frequency component of a predetermined frequency band (e.g., frequency band corresponding to a degree of evaluation target asperities) is desirably included as described above with reference to FIGS. 2A and 2B. Specifically, a captured image desirably includes information (spatial frequency component) corresponding to minimum and maximum wavelengths in a wavelength width (frequency band) defined in advance as an integral interval. However, since the actual size and the number of pixels of a captured illumination image vary with the image capturing distance, it is sometimes difficult to calculate a surface quality evaluation value for evaluating a surface state of a target object depending on the condition.

Considering the foregoing situation, the present exemplary embodiment provides an example of a system for providing a user with guidance on an image capturing condition for calculating a desired surface quality evaluation value before the imaging of the subject. Specifically, the image processing apparatus according to the present exemplary embodiment calculates a condition for acquiring information corresponding to the minimum wavelength based on the subject size and displays the number of pixels of the illumination image reflected on the subject. Further, the image processing apparatus calculates a condition for acquiring information corresponding to the maximum wavelength based on the illumination size and displays the number of pixels of the illumination image reflected on the subject. This system will be described in more detail below.

(Hardware Configuration)

An example of a hardware configuration of an image processing apparatus 1 according to the present exemplary embodiment will be described below with reference to FIG. 4. The image processing apparatus 1 includes a central processing unit (CPU) 401, a read-only memory (ROM) 402, a random access memory (RAM) 403, and a video card (VC) 404. The image processing apparatus 1 further includes a general-purpose interface (general-purpose I/F) 405, a serial advanced technology attachment (SATA) interface (SATA I/F) 406, and a network interface card (NIC) 407.

The CPU 401 executes an operating system (OS) and various programs stored in the ROM 402 or a hard disk drive (HDD) 413 using the RAM 403 as a work memory. Further, the CPU 401 controls operations of components connected via a system bus 408. Each process described below with reference to FIG. 6, 10, 13, 16, 18, or 21 is realized by the CPU 401 by loading program codes stored in the ROM 402 or the HDD 413 to the RAM 403 and executing the loaded program codes.

The VC 404 is an interface for connecting a display 415 to the image processing apparatus 1. The display 415 is realized by a display apparatus, such as a liquid crystal display or an organic electroluminescent (organic EL) display, and presents various types of information to the user by displaying images of the information on a screen.

The general-purpose I/F 405 is an interface for connecting various apparatuses to the image processing apparatus 1 via a serial bus 409. Examples of an apparatus connected via the general-purpose I/F 405 are an input device 410, such as a pointing device, e.g., a mouse, and a keyboard, and an image capturing apparatus 411, such as a digital still camera or a digital video camera.

The SATA I/F 406 is an interface for connecting the HDD 413 and a general-purpose drive 414 for reading and writing from and to various storage mediums to the image processing apparatus 1 via a serial bus 412.

The NIC 407 exchanges input and output information with external apparatuses.

The CPU 401 uses the HDD 413 and various recording mediums mounted on the general-purpose drive 414 as storage areas for storing various types of data. Further, the CPU 401 displays a user interface (UI) (e.g., graphical user interface (GUI)) provided by a program on the display 415 and receives user instructions via the input device 410.

Figure 4:
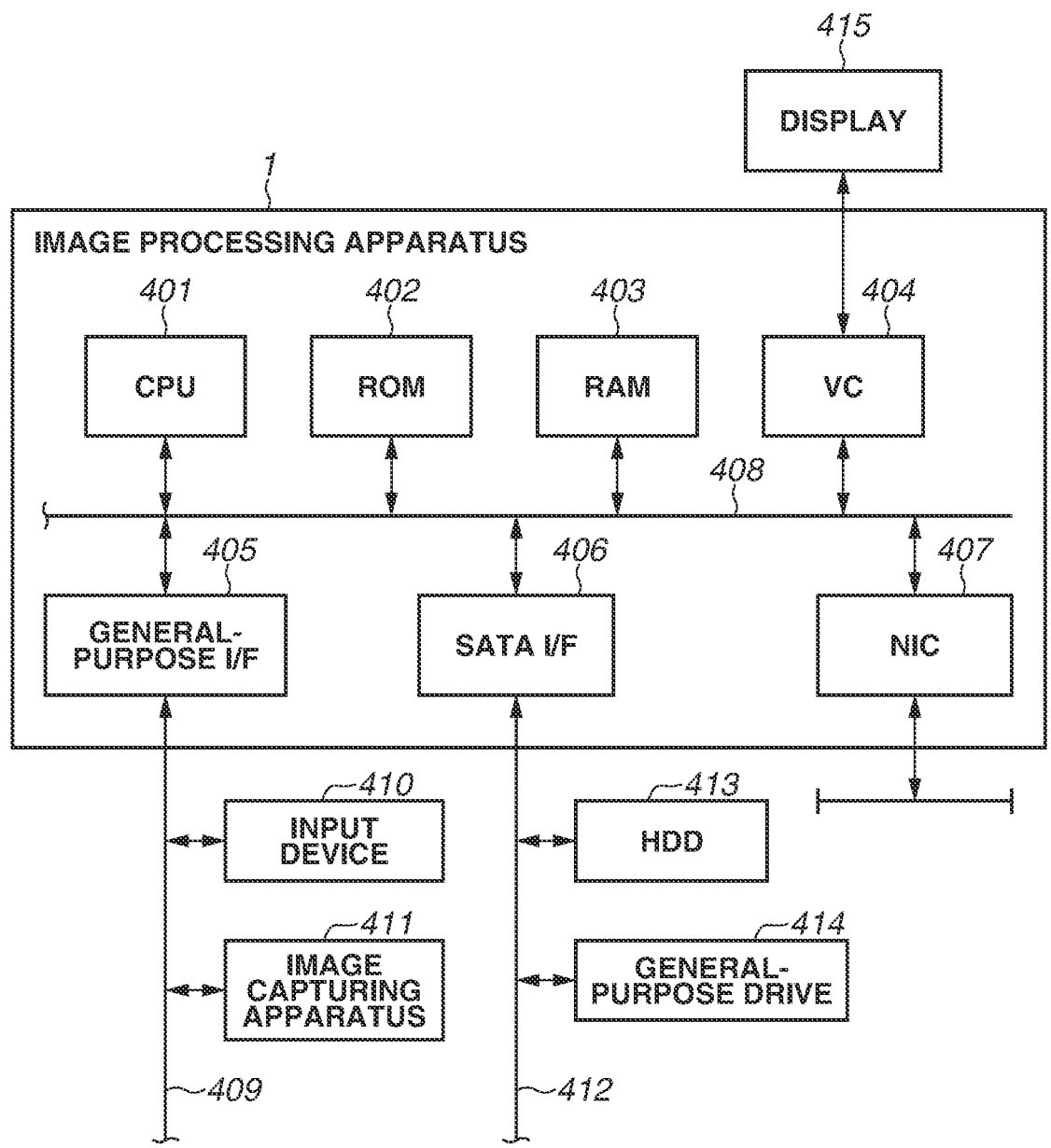
FIG. 4 is a diagram illustrating an example of a hardware configuration of an image processing apparatus.

The configuration illustrated in FIG. 4 is a mere example and is not intended to limit the hardware configuration of the image processing apparatus 1 according to the present exemplary embodiment. As a specific example, another component can be added as needed based on a function provided by the image processing apparatus 1. Further, as another example, a component corresponding to at least part of various apparatuses that are externally mounted on the image processing apparatus 1 via various interfaces can be built in the image processing apparatus 1.

(Functional Configuration)

An example of a functional configuration of the image processing apparatus 1 according to the present exemplary embodiment will be described below with reference to FIG. 5. The image processing apparatus 1 includes a UI control unit 501, an evaluation value type acquisition unit 502, a subject information acquisition unit 503, an illumination information acquisition unit 504, an image capturing apparatus information acquisition unit 505, a geometric condition calculation unit 506, and a display control unit 507.

The UI control unit 501 displays a GUI on the display 415 and acquires input information indicating a user instruction via the input device 410. The UI control unit 501 outputs the acquired input information to each of the evaluation value type acquisition unit 502, the subject information acquisition unit 503, and the illumination information acquisition unit 504. Further, the UI control unit 501 displays guide information described below on the display 415.

The evaluation value type acquisition unit 502 acquires surface quality evaluation value type information specified by the user based on the input information output from the UI control unit 501. The evaluation value type acquisition unit 502 outputs the acquired surface quality evaluation value type information to the geometric condition calculation unit 506.

The subject information acquisition unit 503 acquires evaluation target subject information based on the input information output from the UI control unit 501. According to the present exemplary embodiment, it is assumed that a portion of a target subject that is a surface state evaluation target has a rectangular planar shape, and the subject information acquisition unit 503 acquires subject width information and subject height information each as a value in millimeters. This definition, however, is not intended to limit a range of applications of the present exemplary embodiment of the present disclosure. As a specific example, a portion of a target subject that is a surface state evaluation target can have a different shape such as a triangle or can have a three-dimensional (3D) shape.

Further, information can be acquired in any units other than millimeters with which the actual size and the number of pixels can be associated with each other as described below. The subject information acquisition unit 503 outputs the acquired subject information to the geometric condition calculation unit 506.

The illumination information acquisition unit 504 acquires illumination information based on the input information output from the UI control unit 501. According to the present exemplary embodiment, the illumination information acquisition unit 504 acquires, as illumination information, information about the actual width of the illumination and information about the distance between the illumination and the subject each as a value in millimeters. The illumination information acquisition unit 504 outputs the acquired illumination information to the geometric condition calculation unit 506.

The image capturing apparatus information acquisition unit 505 acquires information (hereinafter, also referred to as "camera information") about the image capturing apparatus 411. A camera information acquisition source is not particularly limited. For example, in a case where camera information is stored in a storage area such as the ROM 402 or the HDD 413, the image capturing apparatus information acquisition unit 505 can acquire the camera information by referring to the storage area. Further, according to the present exemplary embodiment, camera information includes information about an angle of view of the image capturing apparatus 411 and information about the number of horizontal pixels of an image sensor of the image capturing apparatus 411. The image capturing apparatus information acquisition unit 505 outputs the acquired camera information to the geometric condition calculation unit 506.

The geometric condition calculation unit 506 calculates a geometric condition for calculating an evaluation value corresponding to the information acquired by the evaluation value type acquisition unit 502 based on the information output from the subject information acquisition unit 503, the illumination information acquisition unit 504, and the image capturing apparatus information acquisition unit 505. A method for calculating the geometric condition (specifically, the positional relationship between the subject, the illumination, and the image capturing apparatus) will be described in detail below. The geometric condition calculation unit 506 outputs the calculated geometric condition information to the display control unit 507.

The display control unit 507 displays guide information on the display 415 based on the geometric condition information output from the geometric condition calculation unit 506. At this time, the display control unit 507 can display guide information that is to be displayed on a GUI on the display 415 via the UI control unit 501. Details of the guide information will be described below.

Figure 5:
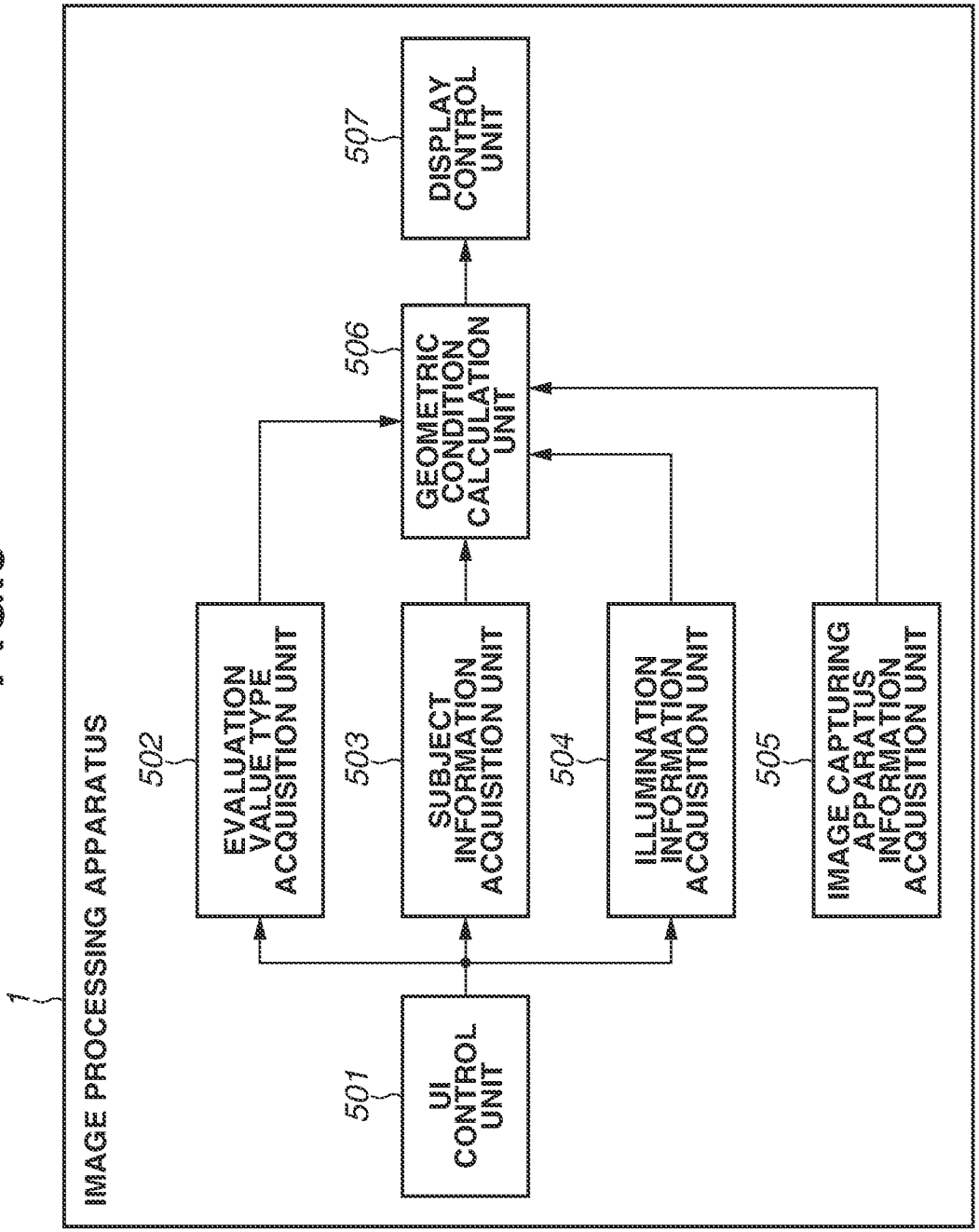
FIG. 5 is a block diagram illustrating an example of a functional configuration of an image processing apparatus.

The configuration illustrated in FIG. 5 is a mere example and is not intended to limit the functional configuration of the image processing apparatus 1 according to the present exemplary embodiment. For example, the configuration illustrated in FIG. 5 can be realized by a plurality of apparatuses cooperating together. As a specific example, some of the components illustrated in FIG. 5 can be realized by another apparatus that is externally mounted on the image processing apparatus 1. Further, as another example, the processing load of at least some of the components illustrated in FIG. 5 can be distributed to a plurality of apparatuses. Further, at least some of the components illustrated in FIG. 5 can be realized by a so-called network service.

(Process)

An example of a process of the image processing apparatus 1 according to the present exemplary embodiment will be described below with reference to FIG. 6, focusing particularly on a process for calculating a geometric condition and displaying guide information based on the geometric condition.

In step S601, the UI control unit 501 displays a predetermined GUI on the display 415 and receives a user instruction via the GUI.

An example of a GUI 7 displayed on the display 415 by the UI control unit 501 will be described below with reference to FIG. 7. The GUI 7 includes a preview region 701, an evaluation value information setting section 702, a subject information setting section 703, an illumination information setting section 704, a message display section 705, a generate-guide button 706, and a capture-image button 707.

The preview region 701 is a region where an image (so-called preview image) indicating a state of a subject before being imaged is displayed in a case where the subject is observed from the image capturing apparatus 411. Further, guide information about the geometric condition, which will be described in detail below, is also displayed in the preview region 701.

The evaluation value information setting section 702 is an interface for receiving designation of a calculation target evaluation value from the user. In the example illustrated in FIG. 7, a calculation target can be designated among a plurality of evaluation value types using a so-called checkbox in the evaluation value information setting section 702.

The subject information setting section 703 is an interface for receiving designation of evaluation target subject information from the user. In the example illustrated in FIG. 7, subject width information and subject height information can be input as subject information in the subject information setting section 703.

The illumination information setting section 704 is an interface for receiving designation of illumination information from the user. In the example illustrated in FIG. 7, information about the width of the illumination and information about the distance between the illumination and the subject can be input as illumination information in the illumination information setting section 704.

The message display section 705 is a display region where a message (e.g., a message to prompt the user to perform various operations) indicating various instructions to the user is displayed. As a specific example, in an initial state, a message that prompts the user to input the surface quality evaluation value type information, the subject information, and the illumination information is displayed in the message display section 705.

The generate-guide button 706 is a button for receiving a user instruction to generate guide information. At the press of the generate-guide button 706, a geometric condition for calculating an evaluation value is calculated based on the evaluation value designated via the evaluation value information setting section 702, the subject information input via the subject information setting section 703, and the illumination information input via the illumination information setting section 704. Then, guide information for guiding the user to satisfy the calculated geometric condition is displayed.

The capture-image button 707 is a button for receiving a user instruction to capture a subject image. At the press of the capture-image button 707 after various settings are set, the image capturing apparatus 411 captures a subject image.

In step S601, the UI control unit 501 presents the above-described UI to the user and awaits an instruction from the user. At the press of the generate-guide button 706 after the various types of information are input by the user, the processing proceeds to step S602.

In step S602, the evaluation value type acquisition unit 502 acquires the surface quality evaluation value type information based on the information (e.g., checkbox on/off state) input via the evaluation value information setting section 702.

For example, FIG. 8 is a diagram illustrating an example of surface quality evaluation value type information. In the example illustrated in FIG. 8, the surface quality evaluation value type information includes information indicating a type of a surface quality evaluation value and information about maximum and minimum wavelengths as wavelength width information that is an integral range for calculating the surface quality evaluation value. The foregoing pieces of information are stored in predetermined storage areas such as the ROM 402 and the HDD 413.

After recognizing the designated surface quality evaluation value type based on the input result in the evaluation value information setting section 702 (e.g., checkbox), the evaluation value type acquisition unit 502 acquires the wavelength width information corresponding to the recognized type. Then, the evaluation value type acquisition unit 502 acquires the information about a maximum wavelength Freq_max and a minimum wavelength Freq_min in the wavelength width corresponding to the series of surface quality evaluation values for which the information is acquired.

While the surface quality evaluation value type is designated by the user according to the present exemplary embodiment described herein, the description is not intended to limit the configuration or the process of the image processing apparatus 1 according to the present exemplary embodiment. As a specific example, in a case where an evaluation value is calculated for each of the series of surface quality evaluation value types or in a case where an evaluation type is calculated for a specific type, the evaluation value type acquisition unit 502 and the evaluation value information setting section 702 can be omitted.

In step S603, after the generate-guide button 706 is pressed and step S602 is performed, the subject information acquisition unit 503 acquires the subject information input via the subject information setting section 703. Hereinafter, as described above with reference to FIG. 7, the subject width information and the subject height information are both acquired as the subject information.

In step S604, the illumination information acquisition unit 504 acquires the illumination information input via the illumination information setting section 704. Hereinafter, as described above with reference to FIG. 7, the information about the width of the illumination and the information about the distance between the illumination and the subject are acquired as the illumination information.

In step S605, the image capturing apparatus information acquisition unit 505 acquires the information about the image capturing apparatus 411. Hereinafter, the camera information including the information about the angle of view of the image capturing apparatus 411, the information about the focal length, and the information about the number of horizontal pixels of the image sensor of the image capturing apparatus 411 is acquired as the information about the image capturing apparatus 411. Further, the camera information is stored in a predetermined storage area such as the ROM 402 or the HDD 413, and the image capturing apparatus information acquisition unit 505 acquires the camera information from the storage area.

In step S606, the geometric condition calculation unit 506 calculates data on the geometric condition of the image capturing apparatus 411 based on the surface quality evaluation value type acquired in step S602, the subject information acquired in step S603, the illumination information acquired in step S604, and the information about the image capturing apparatus 411 acquired in step S605.

The geometric condition according to the present exemplary embodiment includes at least the image capturing distance, i.e., information about the distance between the image capturing apparatus and the subject.

In step S606, the geometric condition calculation unit 506 calculates an image capturing distance range that satisfies the condition for calculating the surface quality evaluation value designated by the user. Furthermore, the geometric condition calculation unit 506 calculates, as guide information for presenting the image capturing distance range to the user, the number of pixels L1 of the illumination image with respect to the image capturing distance, the number of pixels L2 of the illumination image with respect to the image capturing distance, and the difference L2−L1 obtained by subtracting the number of pixels L1 of the illumination image from the number of pixels L2 of the illumination image.

The number of pixels L1 indicates the number of pixels of the illumination image in a case where an image capturing distance corresponding to one end portion of the image capturing distance range is applied. Further, the number of pixels L2 indicates the number of pixels of the illumination image in a case where an image capturing distance corresponding to another end portion of the image capturing distance range is applied. Further, details of the processing of step S606 will be described below.

In step S607, the display control unit 507 displays the number of pixels L1 of the illumination image, the number of pixels L2 of the illumination image, and the difference L2−L1 between the number of pixels L2 and the number of pixels L2 of the illumination image that are calculated in step S606 as guide information on the display 415.

Figure 9:
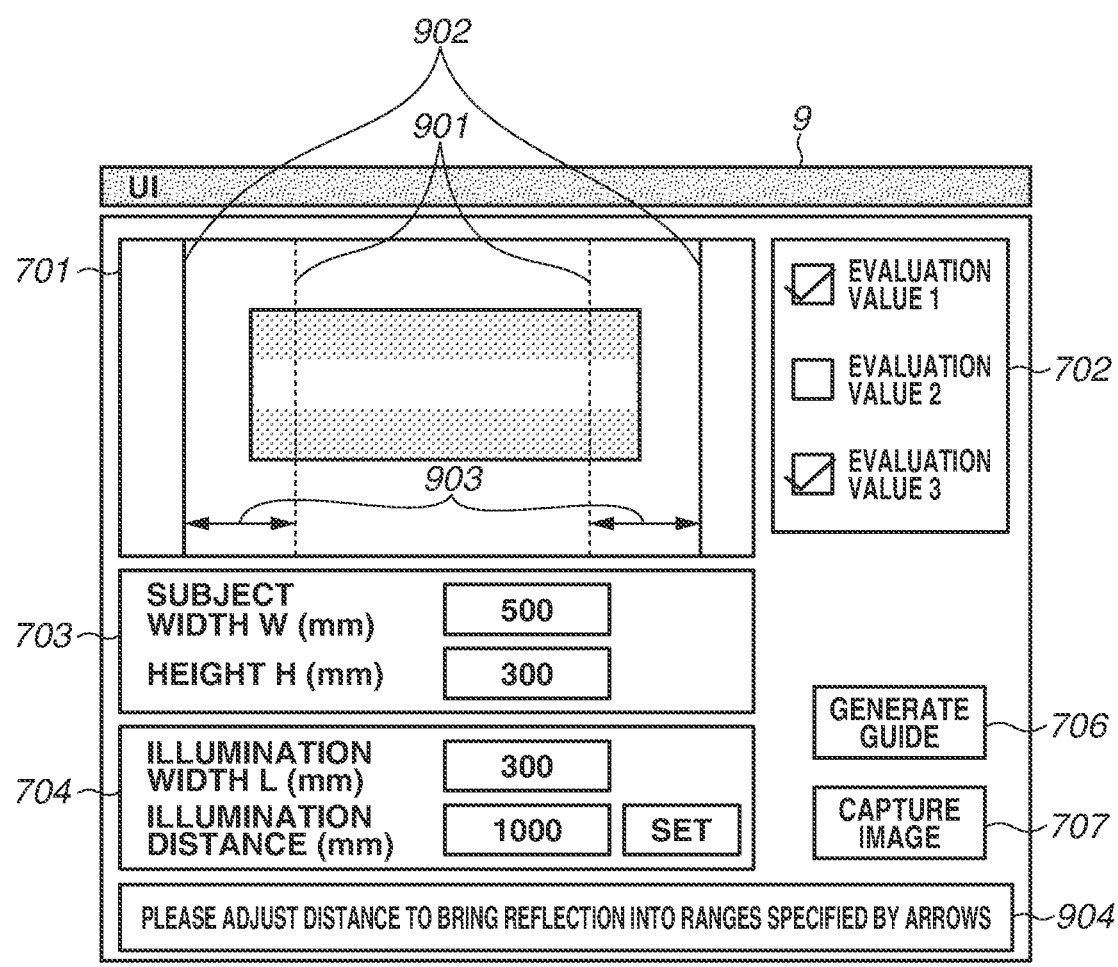
FIG. 9 is a diagram illustrating an example of guide information.

FIG. 9 illustrates an example of guide information displayed in step S607. In the example illustrated in FIG. 9, guide information 901 to guide information 903 are superimposed and displayed on the preview image in the preview region 701 of the GUI 7 described above with reference to FIG. 7.

The guide information 901 specified by a broken line is guide information about an image capturing condition for acquiring a spatial frequency component corresponding to a minimum wavelength for use in calculating a surface quality evaluation value. Further, the guide information 902 specified by a solid line is guide information about an image capturing condition for acquiring a spatial frequency component corresponding to a maximum wavelength for use in calculating a surface quality evaluation value. Details of a surface quality evaluation value calculation method will be described below. Further, the guide information 903 specified by an arrow indicates a region between the guide information 901 and the guide information 902. Under a condition with which right and left end portions of the illumination image are both reflected within the ranges specified by the guide information 903, a surface quality evaluation value for evaluating a target subject surface state is calculable.

In step S607, the display control unit 507 displays information indicating the number of pixels L1 of the illumination image at the image capturing distance that is calculated in step S606 in the preview region 701 as information indicating the image capturing condition for acquiring the spatial frequency component corresponding to the minimum wavelength. Specifically, the display control unit 507 displays the guide information 901 at positions to the right and left of a center of the preview region 701 each at a distance (L1/2) corresponding to a half of the number of pixels L1 from the center of the preview region 701. Thus, a region between the two pieces of guide information 901 has a length corresponding to the number of pixels L1.

Next, the display control unit 507 displays information indicating the number of pixels L2 of the illumination image at the image capturing distance that is calculated in step S606 in the preview region 701 as information indicating the image capturing condition for acquiring the spatial frequency component corresponding to the maximum wavelength. Specifically, the display control unit 507 displays the guide information 902 at positions to the right and left of a center of the preview region 701 each at a distance (L2/2) corresponding to a half of the number of pixels L2 from the center of the preview region 701. Thus, a region between the two pieces of guide information 902 has a length corresponding to the number of pixels L2.

Furthermore, the display control unit 507 displays information indicating the difference L2-L1 obtained by subtracting the number of pixels L1 of the illumination image from the number of pixels L2 of the illumination image that is calculated in step S606 in the preview region 701 as information indicating the image capturing distance range for acquiring the spatial frequency components corresponding to the minimum and maximum wavelengths. Specifically, the display control unit 507 displays the guide information 903 connecting the guide information 901 and the guide information 902 together in the regions to the right and left of the center of the preview region 701.

Consequently, each piece of the guide information 903 has a length ((L2-L1)/2) corresponding to the half of the difference between the number of pixel L2 and the number of pixels L1.

With the foregoing control applied, the user can image an illumination image under a condition for calculating a desired surface quality evaluation value by adjusting the image capturing distance to position both the right and left end portions of the illumination image within the ranges specified by the guide information 903. At this time, the display control unit 507 can display a message in a message display section 904 to prompt the user to adjust the image capturing distance to position the right and left end portions of the illumination image within the ranges specified by the guide information 903.

(Geometric Condition Calculation Process)

Figure 10:
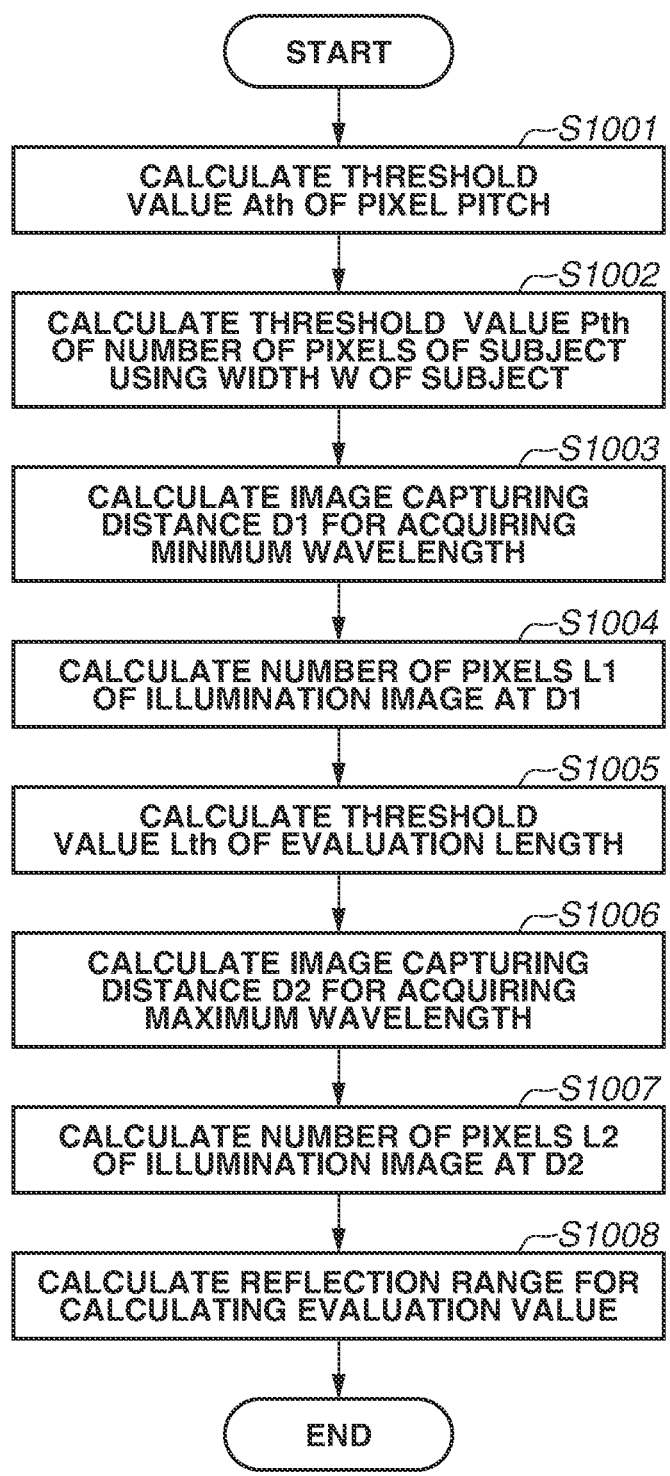
FIG. 10 is a flowchart illustrating an example of a process of an image processing apparatus.

Details of the geometric condition calculation process described above as the processing of step S606 in FIG. 6 will be described below with reference to FIG. 10. As described above, the spatial frequency components corresponding to the maximum and minimum wavelengths in the predetermined integral interval are used in the surface quality evaluation value calculation.

In order to acquire the spatial frequency component corresponding to the minimum wavelength, a condition for acquiring an optical resolution for detecting smaller spatial frequency components than the spatial frequency component corresponding to the minimum wavelength Freq_min, i.e., a condition for higher resolutions, is necessary. In calculating such a condition, for example, a condition on a pixel pitch that is an actual size per pixel is used. On the contrary, in order to acquire the spatial frequency component corresponding to the maximum wavelength, a sufficient length of the actual size for acquiring the spatial frequency component corresponding to the maximum wavelength Freq_max as a captured image size is necessary. In calculating such a condition, for example, a condition on a length of an illumination image in imaging is used.

Figure 6:
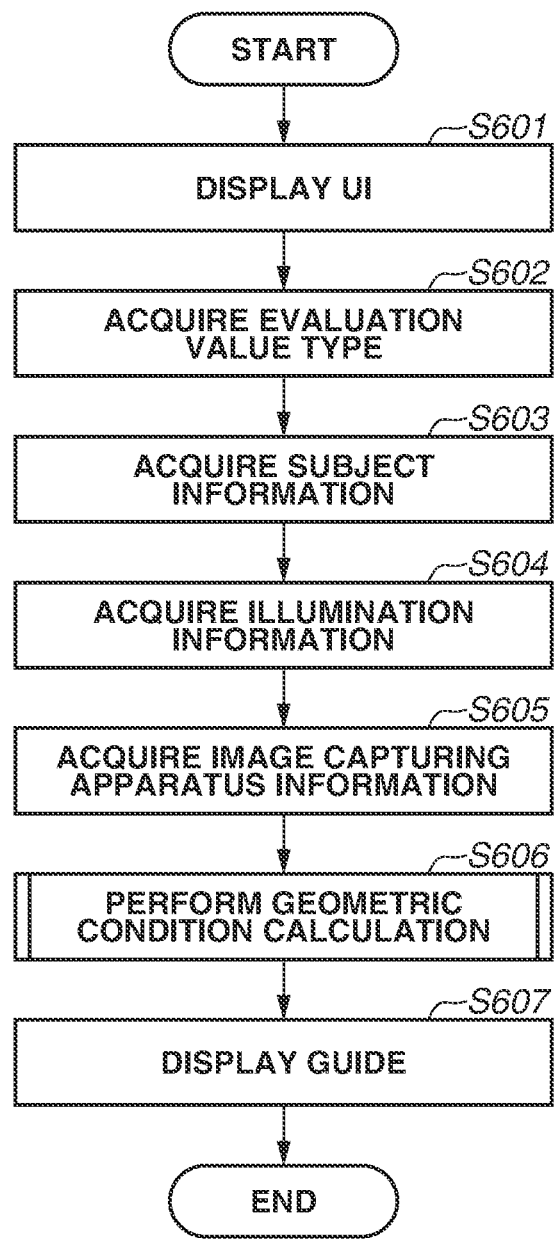
FIG. 6 is a flowchart illustrating an example of a process of an image processing apparatus.

In the processing of step S606 in FIG. 6, the image capturing distance for acquiring the spatial frequency component corresponding to the minimum wavelength is calculated based on the subject size, and the guide information indicating the number of pixels of the illumination image is generated. Further, the image capturing distance for acquiring the spatial frequency component corresponding to the maximum wavelength is calculated based on the size of the illumination image, and the guide information indicating the number of pixels of the reflection of the illumination image is generated.

In step S1001, the geometric condition calculation unit 506 calculates a pixel pitch threshold value Ath for acquiring the spatial frequency component corresponding to the minimum wavelength for use in the surface quality evaluation value calculation based on the minimum wavelength Freq_min acquired in step S602 in FIG. 6. The threshold value Ath is calculated based on the following conditional expression referred to as "formula 1". In formula 1, the threshold value Ath for acquiring the optical resolution for acquiring the spatial frequency component corresponding to the minimum wavelength Freq_min is defined as the value corresponding to the half of the minimum wavelength Freq_min.

$$Ath = Freq\_min/2 \qquad \text{(formula 1).}$$

In step S1002, the geometric condition calculation unit 506 calculates a threshold value Pth of the number of pixels of the subject using a width W of the actual size of the subject that is acquired in step S603 in FIG. 6. The threshold value Pth is calculated based on the following conditional expression referred to as "formula 2".

$$Pth = W/Ath \qquad \text{(formula 2).}$$

Figure 11:
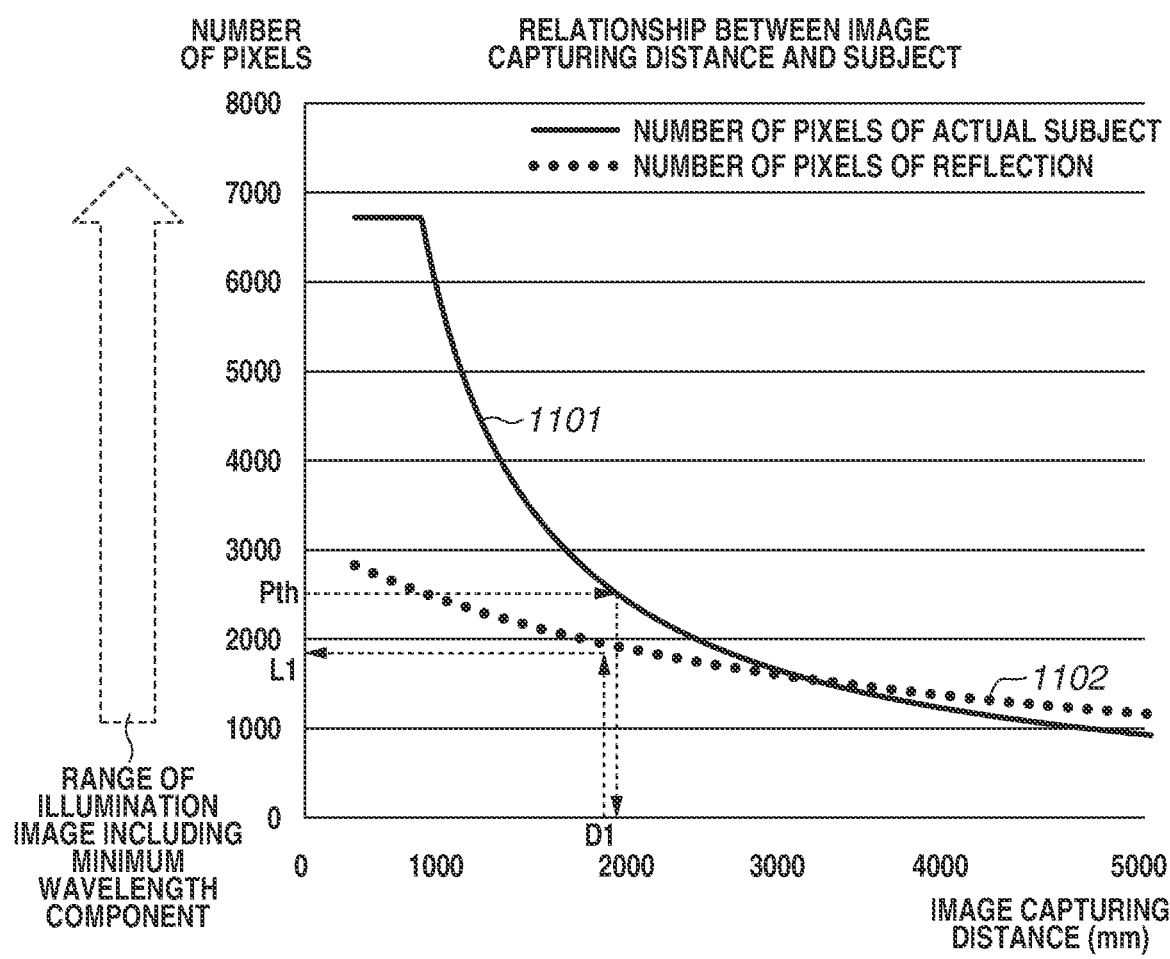
FIG. 11 is a diagram illustrating an example of a relationship between an image capturing distance, a subject, and an illumination image.

For example, FIG. 11 is a diagram illustrating an example of a relationship between the image capturing distance, the number of pixels of the subject, and the number of pixels of the illumination image. In the example illustrated in FIG. 11, a vertical axis represents the number of pixels of the subject, and a horizontal axis represents the image capturing distance. In FIG. 11, a graph 1101 specified by a solid line indicates the number of pixels of the subject. The threshold value Pth of the number of pixels of the subject that is calculated in step S1002 is the number of pixels of the subject for acquiring the spatial frequency component corresponding to the minimum wavelength. Specifically, a surface quality evaluation value based on the spatial frequency component corresponding to the minimum wavelength is calculable in a case where the number of pixels of the subject is greater than or equal to the threshold value Pth.

In step S1003, the geometric condition calculation unit 506 calculates an image capturing distance D1 as a condition of the image capturing distance for acquiring the spatial frequency component corresponding to the minimum wavelength using the angle of view θ and the number of horizontal pixels Pn of the image capturing apparatus 411 that are acquired in step S605 in FIG. 6. The image capturing distance D1 is calculated based on the following conditional expression referred to as "formula 3".

$$D1=Pth*Pn/(2*Pth*\tan(\theta/2))  \quad\text{(formula 3)}$$

The image capturing distance D1 corresponds to the image capturing distance in a case where the number of pixels of the subject is equal to the threshold value Pth in the example illustrated in FIG. 11. Specifically, in a case where the actual image capturing distance is less than or equal to the image capturing distance D1, an image including the spatial frequency component corresponding to the minimum wavelength is captured. While the number of horizontal pixels of the image capturing apparatus 411 is used in calculating the image capturing distance D1 according to the present exemplary embodiment, the number of vertical pixels can be used instead of the number of horizontal pixels. In this case, actual height information can be used as subject information. Further, camera information to be acquired is not limited to an angle of view, and any other optical information such as a focal length from which the threshold value Pth of the number of pixels of the subject is calculable can be acquired.

In step S1004, the geometric condition calculation unit 506 calculates the number of pixels L1 of the illumination image at the image capturing distance D1 using a width WL and a distance DL of the illumination that are acquired in step S604 in FIG. 6. The number of pixels L1 of the illumination image is calculated based on the following conditional expression referred to as "formula 4".

$$L1=WL*Pn/\{2*(DL+D1)*\tan(\theta/2)\}  \quad\text{(formula 4)}$$

In FIG. 11, a graph 1102 specified by a broken line illustrates an example of a relationship between the number of pixels of the illumination image and the image capturing distance. The number of pixels L1 of the illumination image that is calculated in step S1004 corresponds to the number of pixels of the illumination image at the image capturing distance D1 in the example illustrated in FIG. 11. Specifically, the processing of step S1004 corresponds to the processing of calculating the number of pixels of the illumination image from the image capturing distance D1. Further, an image including the spatial frequency component corresponding to the minimum wavelength is capturable in a case where the number of pixels of the actual illumination image is greater than or equal to L1 based on the relationship between the subject and the image capturing distance.

In step S1005, the geometric condition calculation unit 506 calculates a threshold value Lth of an evaluation length of the illumination image based on the maximum wavelength Freq_max acquired in step S602 in FIG. 6 as an image capturing condition for acquiring the spatial frequency component corresponding to the maximum wavelength. The threshold value Lth is calculated based on the following conditional expression referred to as "formula 5". According to the present exemplary embodiment, the threshold value Lth is defined as a length that includes ten periods of the maximum wavelength Freq_max.

$$Lth=\text{Freq\_max}*10  \quad\text{(formula 5)}$$

Figure 12:
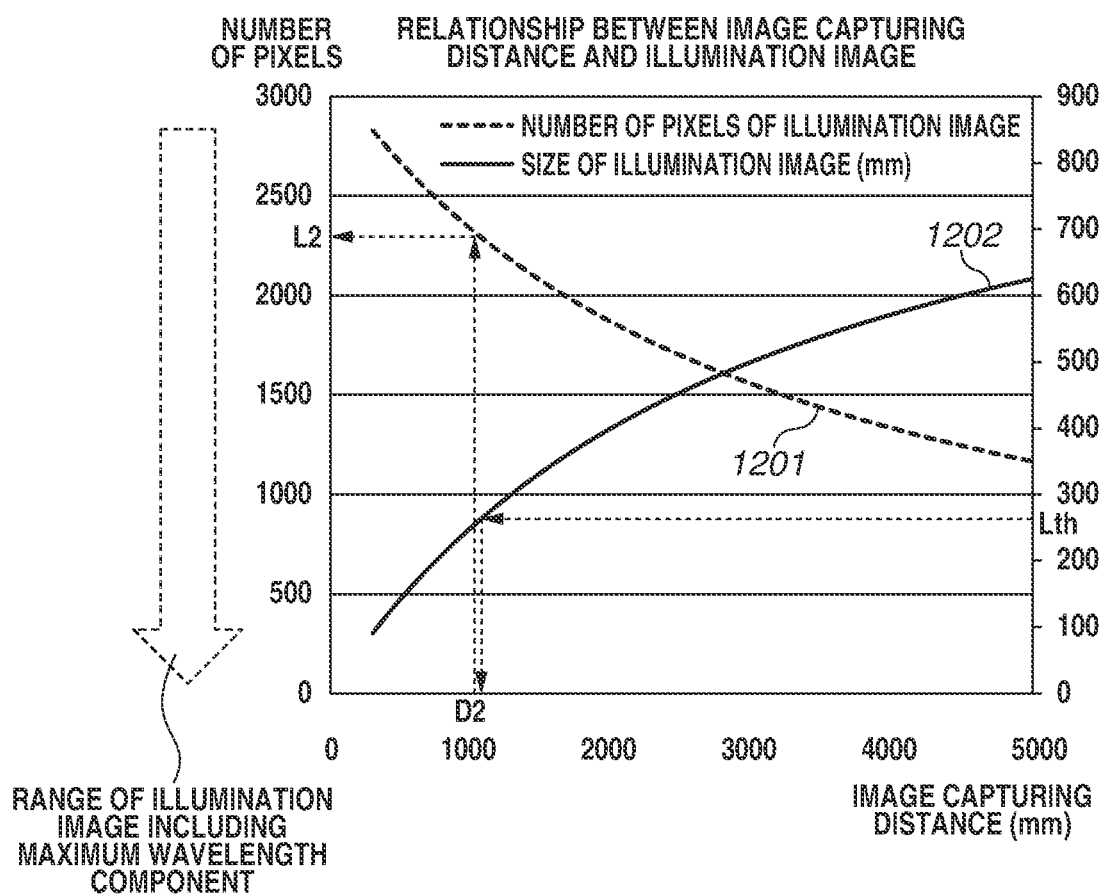
FIG. 12 is a diagram illustrating an example of a relationship between an image capturing distance and an illumination image.

For example, FIG. 12 is a diagram illustrating an example of a relationship between the image capturing distance and the illumination image. In the example illustrated in FIG. 12, a first vertical axis (left vertical axis) represents the number of pixels of the illumination image, a second vertical axis (right vertical axis) represents the actual size of the illumination image in millimeters, and a horizontal axis represents the image capturing distance. A graph 1202 specified by a solid line illustrates the size of the illumination image for each image capturing distance to refer to the second vertical axis. As described above, there is a feature that the actual size of the illumination image reflected on the subject increases at longer image capturing distances. At this time, the threshold value Lth calculated in step S1005 corresponds to a value Lth in FIG. 12, and in a case where the size of the illumination image is greater than this value, the condition for acquiring the spatial frequency component corresponding to the maximum wavelength is satisfied.

In step S1006, the geometric condition calculation unit 506 calculates a minimum image capturing distance D2 for acquiring the spatial frequency component corresponding to the maximum wavelength using the width WL and a distance LD of the illumination that are calculated in step S603 in FIG. 6 and the threshold value Lth of the evaluation length of the illumination image. The minimum image capturing distance D2 is calculated based on the following conditional expression referred to as "formula 6".

$$D2=(Lth-DL)/(WL-Lth)  \quad\text{(formula 6)}$$

The minimum image capturing distance D2 calculated in step S1006 corresponds to an image capturing distance in a case where the number of pixels of the illumination image is equal to Lth in the example illustrated in FIG. 12. As described above, the condition for acquiring the spatial frequency component corresponding to the maximum wavelength is a case where the number of pixels of the illumination image is greater than or equal to the threshold value Lth. Thus, the condition for acquiring the spatial frequency component corresponding to the maximum wavelength is satisfied in a case where the image capturing distance is greater than or equal to the minimum image capturing distance D2.

In step S1007, the geometric condition calculation unit 506 calculates the number of pixels L2 of the illumination image at the minimum image capturing distance D2 calculated in step S1006 using the angle of view θ and the number of horizontal pixels of the image capturing apparatus 411 that are acquired in step S605 in FIG. 6. The number of pixels L2 of the illumination image is calculated based on the following conditional expression referred to as "formula 7".

$$L2=Lth*Pn/(2*D2*\tan(\theta/2))  \quad\text{(formula 7)}$$

In FIG. 12, a graph 1201 specified by a broken line illustrates an example of a relationship between the number of pixels of the illumination image and the image capturing distance. As described above, there is a feature that the number of pixels of the illumination image decreases at longer image capturing distances. The number of pixels L2 of the illumination image that is calculated in step S1007 corresponds to the number of pixels of the illumination image at the image capturing distance D2. Further, an image including the spatial frequency component corresponding to the maximum wavelength is capturable in a case where the number of pixels of the actual illumination image is less than or equal to L2 based on the relationship between the image capturing distance and the size of the illumination image.

In step S1008, the geometric condition calculation unit 506 calculates an illumination image range R where the condition for acquiring the spatial frequency component corresponding to the maximum wavelength and the condition for acquiring the spatial frequency component corresponding to the minimum wavelength are compatible. The illumination image range R is calculated based on the following conditional expression referred to as "formula 8".

$$R=(L2-L1)/2 \qquad \text{(formula 8)}.$$

As described above, according to the present exemplary embodiment, an image capturing distance range for calculating a desired evaluation value is presented as guide information to the user prior to the imaging of an evaluation target subject. Thus, the user can easily set an image capturing condition for acquiring the desired evaluation value by adjusting the image capturing distance based on the displayed guide information.

A second exemplary embodiment of the present disclosure will be described below. An example of a case where the image capturing condition for acquiring the spatial frequency component corresponding to the minimum wavelength is calculated based on the subject size and the guide information is displayed as the number of pixels of the illumination image according to the first exemplary embodiment is described above. Meanwhile, a guidance method for acquiring the spatial frequency component corresponding to the minimum wavelength is not limited to the above-described example according to the first exemplary embodiment.

Thus, an example of a case where the image capturing condition for acquiring the spatial frequency component corresponding to the minimum wavelength is calculated based on the subject size and guide information is displayed as the number of pixels of the subject according to the present exemplary embodiment will be described below. The following description of the present exemplary embodiment focuses on differences from the first exemplary embodiment described above, and detailed descriptions of those that are substantially similar to the first exemplary embodiment are omitted.

(Process)

An example of a process of an image processing apparatus according to the present exemplary embodiment will be described below with reference to FIG. 13, focusing particularly on a process of calculating a geometric condition and displaying guide information based on the calculated geometric condition.

In step S1301, the UI control unit 501 displays a predetermined GUI on the display 415 and receives a user instruction via the GUI.

Figure 14:
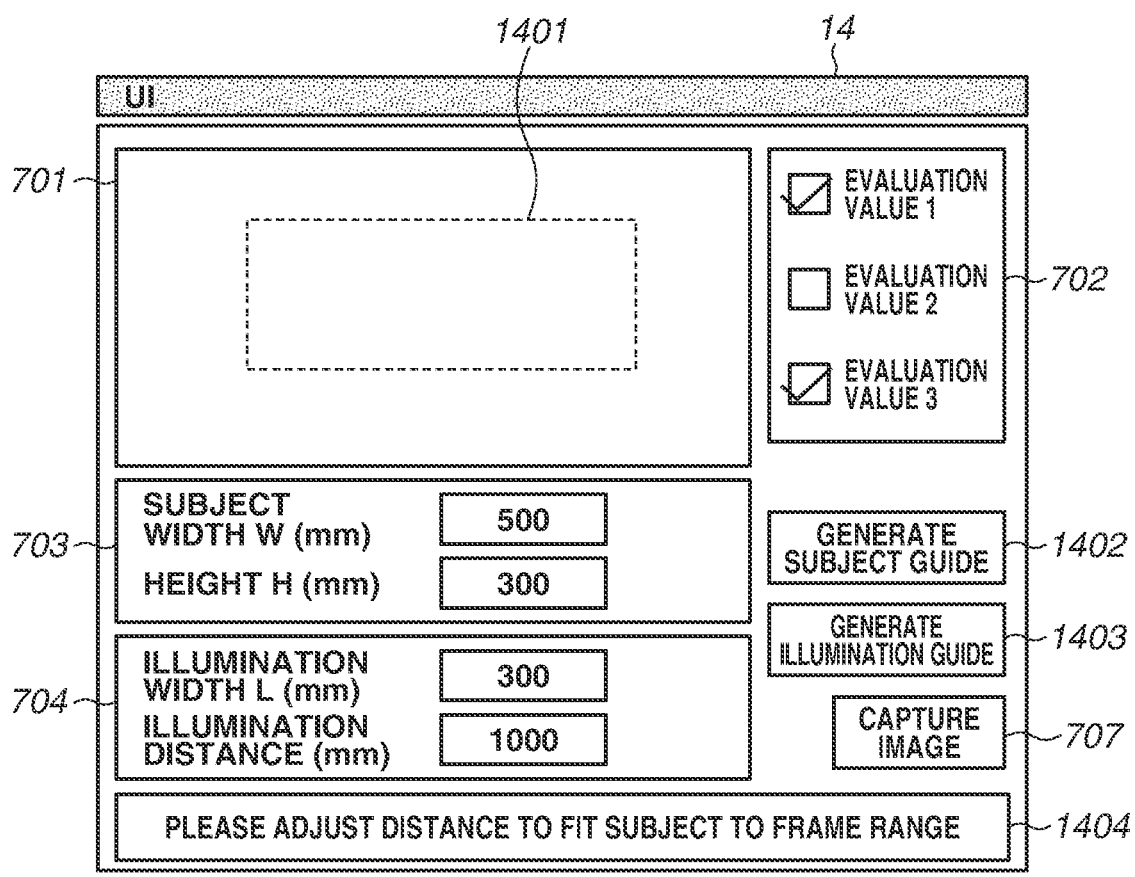
FIG. 14 is a diagram illustrating an example of a GUI.

An example of a GUI 14 displayed on the display 415 by the UI control unit 501 according to the present exemplary embodiment will be described below with reference to FIG. 14. The GUI 14 is different from the GUI 7 described above with reference to FIG. 7 in that the GUI 14 includes a generate-subject-guide button 1402 and a generate-illumination-guide button 1403 instead of the generate-guide button 706 and that guide information displayed in the preview region 701 is different from the guide information in FIG. 7.

The generate-subject-guide button 1402 is an interface for receiving a user instruction to generate guide information about the subject size. At the press of the generate-subject-guide button 1402, guide information 1401 about the subject size that satisfies the image capturing condition for acquiring the spatial frequency corresponding to the maximum wavelength is displayed in the preview region 701.

The generate-illumination-guide button 1403 is an interface for receiving a user instruction to generate guide information about the illumination width. At the press of the generate-illumination-guide button 1403, guide information about the width of the illumination image that satisfies the image capturing condition for acquiring the spatial frequency corresponding to the maximum wavelength is generated.

Figure 7:
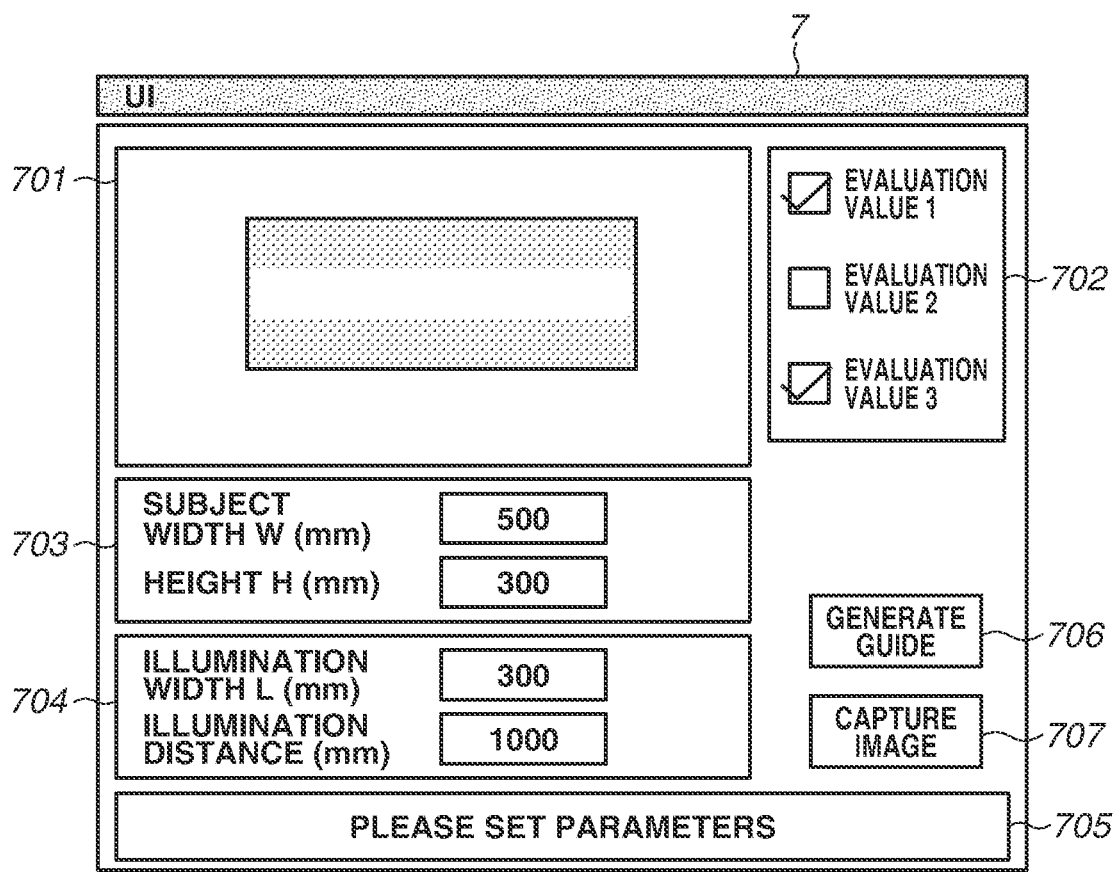
FIG. 7 is a diagram illustrating an example of a graphical user interface (GUI).

Further, a message display section 1404 corresponds to the message display section 705 in the example illustrated in FIG. 7. In the message display section 1404, a message that prompts the user to perform an operation is displayed based on a current situation.

In step S1301, the UI control unit 501 presents the above-described UI to the user and awaits an instruction from the user. Then, in a case where the various types of information are input and then the generate-subject-guide button 1402 is pressed by the user, the processing proceeds to step S1302.

Steps S1302 to S1305 are substantially similar to steps S602 to S605 in FIG. 6, so that detailed descriptions thereof are omitted.

In step S1306, the geometric condition calculation unit 506 calculates the image capturing condition for acquiring the spatial frequency component corresponding to the minimum wavelength. Specifically, first, the geometric condition calculation unit 506 performs steps S1101 and S1102 illustrated in FIG. 10 and calculates the threshold value Pth of the number of pixels on the subject width for acquiring the spatial frequency component corresponding to the minimum wavelength. Then, the geometric condition calculation unit 506 calculates a threshold value Pth' of the subject height using the acquired information about an actual height H of the subject. The threshold value Pth' is calculated based on the following conditional expression referred to as "formula 9".

$$Pth'=H/Ath \qquad \text{(formula 9)}.$$

In step S1307, the display control unit 507 displays the number of pixels of the subject that is calculated in step S1306 on the display 415 as guide information for acquiring the spatial frequency component corresponding to the minimum wavelength. For example, in the example illustrated in FIG. 14, the guide information 1401 indicating a range where the subject width is less than or equal to the threshold value Pth and a range where the subject height is less than or equal to the threshold value Pth' is displayed. As described above, the condition for acquiring the spatial frequency component corresponding to the minimum wavelength is satisfied in a case where the imaging is performed so that the subject is larger than the range displayed as the guide information 1401. Thus, the display control unit 507 displays, in the message display section 1404, a message that prompts the user to adjust the imaging geometric condition so that the subject size corresponds to the frame range specified as the guide information 1401 (or the subject size becomes greater than or equal to the frame range). Then, the UI control unit 501 awaits input of a user instruction. Adjusting the imaging geometric condition based on the above-described message makes it possible to satisfy the imaging geometric condition for calculating the target surface quality evaluation value through an easy operation described below with reference to FIG. 15. In a case where the imaging geometric condition is adjusted based on the displayed guide and the generate-illumination-guide button 1403 is pressed, the processing proceeds to step S1308.

In step S1308, the geometric condition calculation unit 506 calculates the image capturing condition for acquiring the spatial frequency component corresponding to the maximum wavelength. Specifically, steps S1101 to S1107 in the example illustrated in FIG. 11 are performed.

In step S1309, the display control unit 507 displays guide information for acquiring the spatial frequency component corresponding to the maximum wavelength on the display 415.

Figure 15:
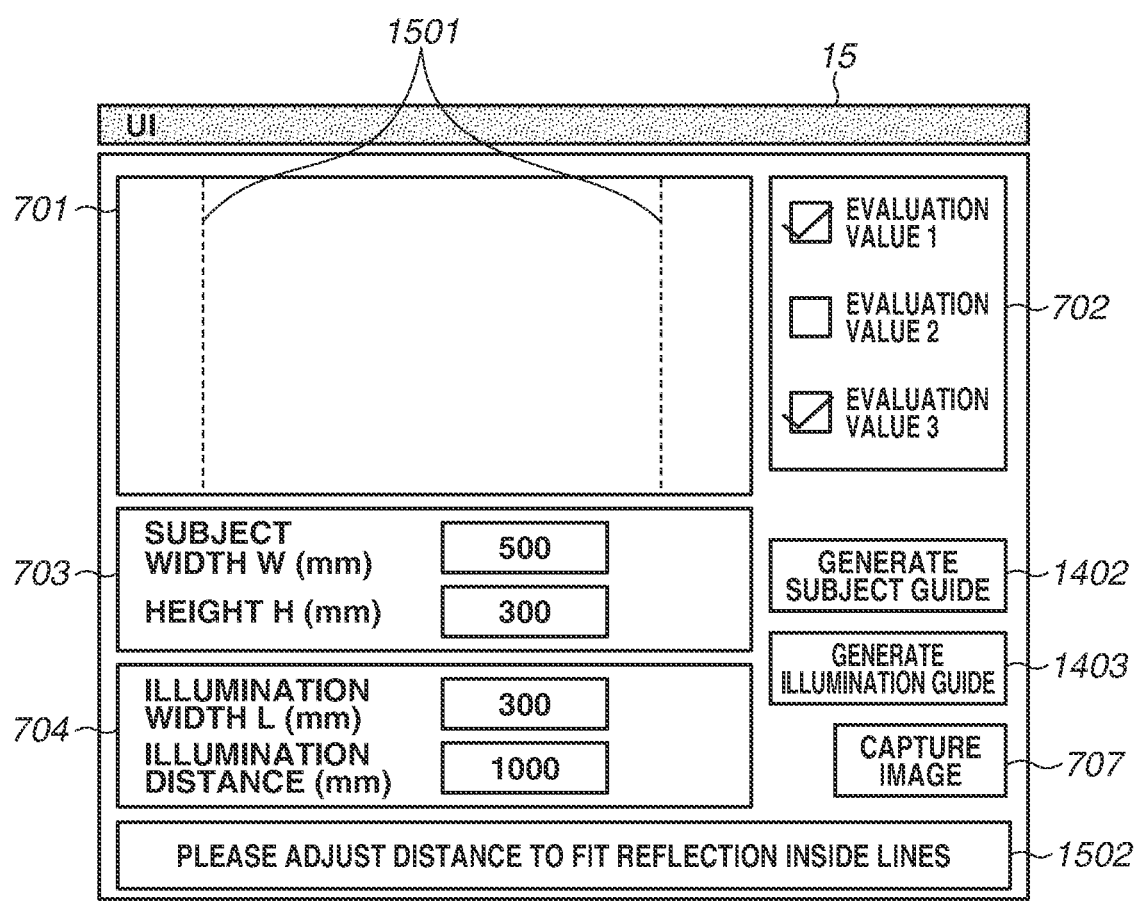
FIG. 15 is a diagram illustrating an example of a GUI.

An example of a GUI 15 displayed on the display 415 by the UI control unit 501 according to the present exemplary embodiment will be described below with reference to FIG. 15. The difference between the GUI 15 and the GUI 14 described above with reference to FIG. 14 is the guide information displayed in the preview region 701.

As in the first exemplary embodiment described above, guide information 1501 specified by a broken line indicates the number of pixels L2 of the illumination image. Specifically, the spatial frequency component corresponding to the maximum wavelength is acquirable in a case where the illumination image fits in a range specified by the guide information 1501. The image capturing condition for acquiring the spatial frequency component corresponding to the maximum wavelength is that the image capturing distance is greater than or equal to D2. Thus, for example, the image capturing distance is desirably adjusted from the distance (D1) set in step S1307 in a direction to move the image capturing apparatus toward the subject while maintaining the state where the illumination image fits in the range specified by the guide information 1501. This makes it possible to find an image capturing distance for acquiring both the spatial frequency component corresponding to the minimum wavelength and the spatial frequency component corresponding to the maximum wavelength.

Through the foregoing process, the geometric condition is set step by step using the subject size and the illumination image size. As described above, according to the present exemplary embodiment, the user can easily set the image capturing condition for acquiring the desired evaluation value.

While an operational procedure in which the generate-subject-guide button 1402 is pressed and thereafter the generate-illumination-guide button 1403 is pressed according to the present exemplary embodiment is described above, the order of the operations is not limited to the above-described example. As a specific example, an operational procedure in which the generate-illumination-guide button 1403 is pressed first and thereafter the generate-subject-guide button 1402 is pressed is also applicable. In this case, steps S1308 and S1309 are performed prior to steps S1306 and S1307.

A third exemplary embodiment of the present disclosure will be described below. According to the first and second exemplary embodiments, the guide information is displayed so that the actual image capturing distance is between the maximum image capturing distance D1 for acquiring the spatial frequency component corresponding to the minimum wavelength and the minimum image capturing distance D2 for acquiring the spatial frequency component corresponding to the maximum wavelength.

The image capturing distances D1 and D2 have a relationship as illustrated in FIGS. 22A and 22B. FIGS. 22A and 22B are diagrams illustrating an example of a relationship between the image capturing distance and the illumination image. In FIGS. 22A and 22B, a horizontal axis represents the image capturing distance (millimeters), a first vertical axis represents the actual size (millimeters) of the illumination image, and a second vertical axis represents the number of pixels.

In FIG. 22A, a graph 2201 specified by a solid line illustrates an example of a relationship between the image capturing distance and the actual size (first vertical axis) of the illumination image and is similar to the graph 1201 specified by the broken line in FIG. 12. Further, a graph 2204 specified by a broken line illustrates the size of the illumination image corresponding to the threshold value Lth calculated based on the conditional expression referred to as "formula 5" according to the first exemplary embodiment.

At this time, the minimum image capturing distance D2 for acquiring the spatial frequency component corresponding to the maximum wavelength is indicated by an x-coordinate of an intersection point A of the graphs 2204 and 2201, and the spatial frequency component corresponding to the maximum wavelength is acquirable in a case where the actual image capturing distance is greater than or equal to D2.

Meanwhile, a graph 2202 specified by a broken line illustrates an example of a relationship between the image capturing distance and the number of pixels of the subject (second vertical axis) and is similar to the graph 1101 specified by the solid line in FIG. 11.

Further, a graph 2205 specified by a broken line illustrates the number of pixels of the subject that corresponds to the threshold value Pth calculated based on the conditional expression referred to as "formula 2" according to the first exemplary embodiment. At this time, the maximum image capturing distance D1 for acquiring the spatial frequency component corresponding to the minimum wavelength is indicated by an x-coordinate of an intersection point C of the graphs 2205 and 2202, and in a case where the actual image capturing distance is less than D1, the spatial frequency component corresponding to the minimum wavelength is acquirable.

Thus, according to the first and second exemplary embodiments, guide information is displayed so that the actual image capturing distance is included within a range 2206 of the image capturing distances D1 and D2 specified by an arrow.

Meanwhile, there may be a case where an image capturing distance that satisfies both the condition for acquiring the spatial frequency component corresponding to the minimum wavelength and the condition for acquiring the spatial frequency component corresponding to the maximum wavelength does not exist, depending on the geometric condition of the illumination. As a specific example, in FIG. 22A, a graph 2203 specified by a broken line illustrates the illumination image size in a case where the illumination size is less than the illumination size in the case illustrated by the graph 2201.

In the case where the illumination size is small as described above, the size of the illumination image is smaller than that in the case illustrated by the graph 2201. In this case of the illumination size, a minimum image capturing distance D2a for acquiring the spatial frequency component corresponding to the maximum wavelength is indicated by an x-coordinate of an intersection point B of the graphs 2204 and 2203.

The maximum image capturing distance D1 for acquiring the spatial frequency component corresponding to the minimum wavelength is calculated based on formulas 1 to 3 independently of the illumination size. Thus, in a case where the illumination size is small, D1<D2a is satisfied, and an image capturing distance that satisfies both the condition for acquiring the spatial frequency component corresponding to the minimum wavelength and the condition for acquiring the spatial frequency component corresponding to the maximum wavelength does not exist.

Further, there may be a case where an image capturing distance that satisfies both the condition for acquiring the spatial frequency component corresponding to the minimum wavelength and the condition for acquiring the spatial frequency component corresponding to the maximum wavelength does not exist in a case where the illumination distance changes.

In FIG. 22B, a graph 2207 specified by a broken line illustrates an example of a relationship between the actual size of the illumination image and the image capturing distance in a case where the illumination distance is shorter than that in the case illustrated by the graph 2201. In FIG. 22B, the same reference numeral as in FIG. 22A indicates the same target as in FIG. 22A.

As in FIG. 22A, the size of the illumination image is smaller in the case where the illumination distance is short than in the case where the illumination distance is long. In this case, a minimum image capturing distance D2b for acquiring the spatial frequency component corresponding to the maximum wavelength is indicated by an x-coordinate of an intersection point D of the graphs 2204 and 2207. At this time, D1<D2b is satisfied as illustrated in FIG. 22B, and there may be a case where an image capturing distance that satisfies both the condition for acquiring the spatial frequency component corresponding to the minimum wavelength and the condition for acquiring the spatial frequency component corresponding to the maximum wavelength does not exist even in a case where the illumination distance changes.

Thus, an example where a notification of illumination information is provided to the user in a case where an image capturing distance that satisfies both the condition for acquiring the spatial frequency component corresponding to the minimum wavelength and the condition for acquiring the spatial frequency component corresponding to the maximum wavelength does not exist according to the present exemplary embodiment will be described below.

(Geometric Condition Calculation Process)

Figure 16:
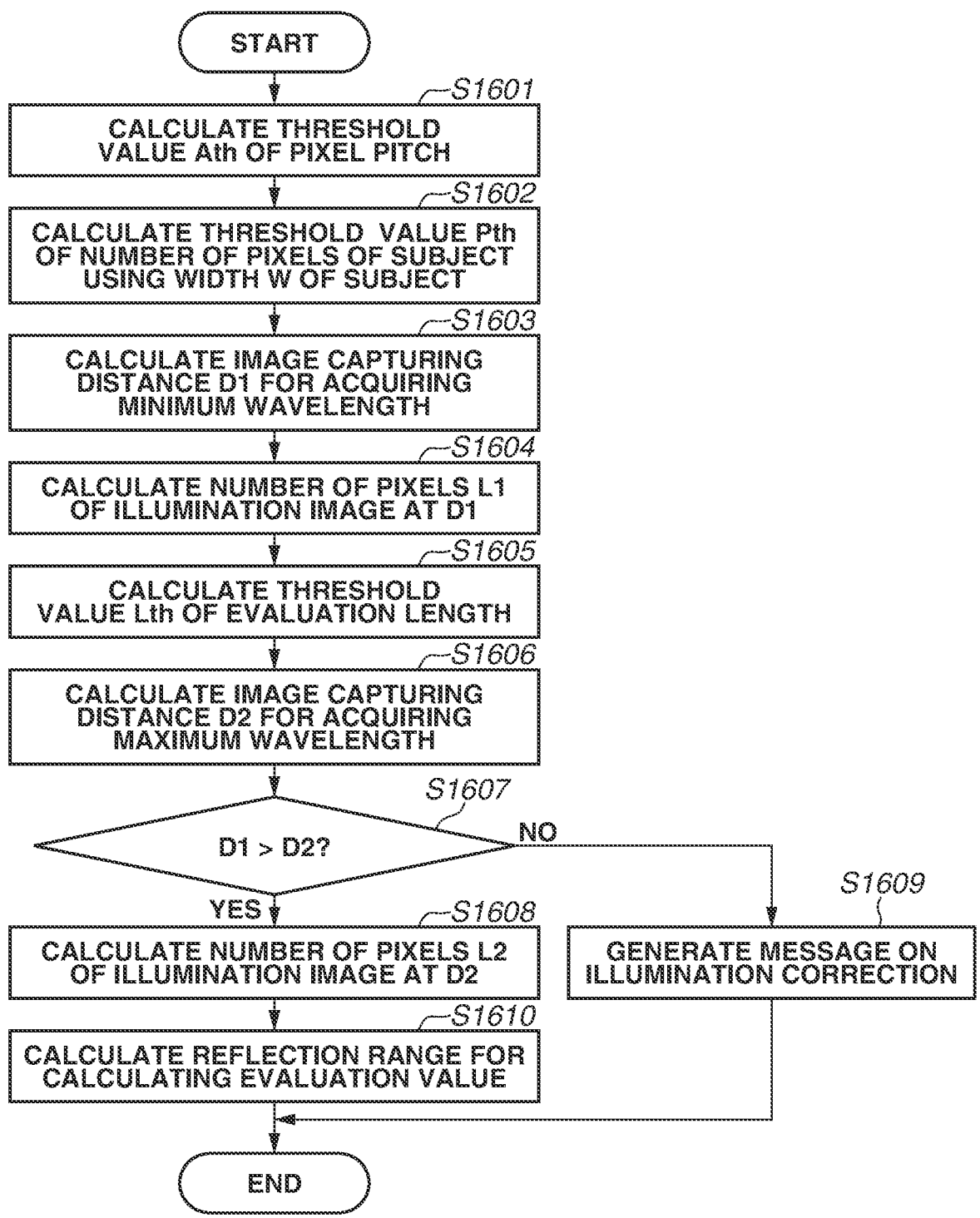
FIG. 16 is a flowchart illustrating an example of a process of an image processing apparatus.

Details of a geometric condition calculation process that is performed by the image processing apparatus according to the present exemplary embodiment will be described below with reference to FIG. 16. Steps S1601 to S1606 are substantially similar to steps S1001 to S1006 in FIG. 10, so that detailed descriptions thereof are omitted.

In step S1607, the geometric condition calculation unit 506 compares a magnitude relationship between the image capturing distance D1 calculated in step S1603 and the image capturing distance D2 calculated in step S1606.

In step S1607, in a case where the geometric condition calculation unit 506 determines that the image capturing distance D1 is greater than the image capturing distance D2 (YES in step S1607), the processing proceeds to step S1608. As described above, an image capturing distance that satisfies both the condition for acquiring the spatial frequency component corresponding to the minimum wavelength and the condition for acquiring the spatial frequency component corresponding to the maximum wavelength exists in a case where the image capturing distance D1 is greater than the image capturing distance D2. Further, steps S1608 and S1610 are substantially similar to steps S1007 and S1008 in FIG. 10, so that detailed descriptions thereof are omitted.

On the other hand, in a case where the geometric condition calculation unit 506 determines in step S1607 that the image capturing distance D1 is less than or equal to the image capturing distance D2 (NO in step S1607), the processing proceeds to step S1609. In this case, an image capturing distance that satisfies both the condition for acquiring the spatial frequency component corresponding to the minimum wavelength and the condition for acquiring the spatial frequency component corresponding to the maximum wavelength does not exist.

In step S1609, the geometric condition calculation unit 506 generates a message that prompts the user to correct the illumination because an illumination image reflected on the subject is small under the geometric condition of the illumination at this time point.

Specifically, as illustrated in FIGS. 22A and 22B, smaller illumination images are reflected on the subject at longer image capturing distances or with smaller illumination sizes. Thus, for example, the geometric condition calculation unit 506 generates a message that prompts the user to increase the illumination distance or the illumination size so that the illumination image increases in size. The message generated by the geometric condition calculation unit 506 is displayed, for example, in a message display section 1502 of the GUI 15 by the UI control unit 501.

Application of the foregoing process makes it possible to provide an illumination correction method for calculating a desired evaluation value to the user even in a case where an image capturing condition for calculating the evaluation value does not exist. Thus, the user can easily set an image capturing condition for acquiring the desired evaluation value by correcting the illumination based on the presented correction method.

A fourth exemplary embodiment of the present disclosure will be described below. Examples of a case where a geometric condition is calculated using illumination information according to the first to third exemplary embodiments are described above. Meanwhile, any methods for estimating distance information between the image capturing apparatus and the subject in imaging can be used and are not limited, and illumination information is not always essential information. Thus, an example of a case without using illumination information according to the present exemplary embodiment will be described below. Specifically, an example of a case where the image capturing condition for acquiring the spatial frequency component corresponding to the minimum wavelength is calculated based on the subject size and the image capturing condition for acquiring the spatial frequency component corresponding to the maximum wavelength is calculated based on the number of pixels of the subject according to the present exemplary embodiment will be described below.

(Functional Configuration)

Figure 17:
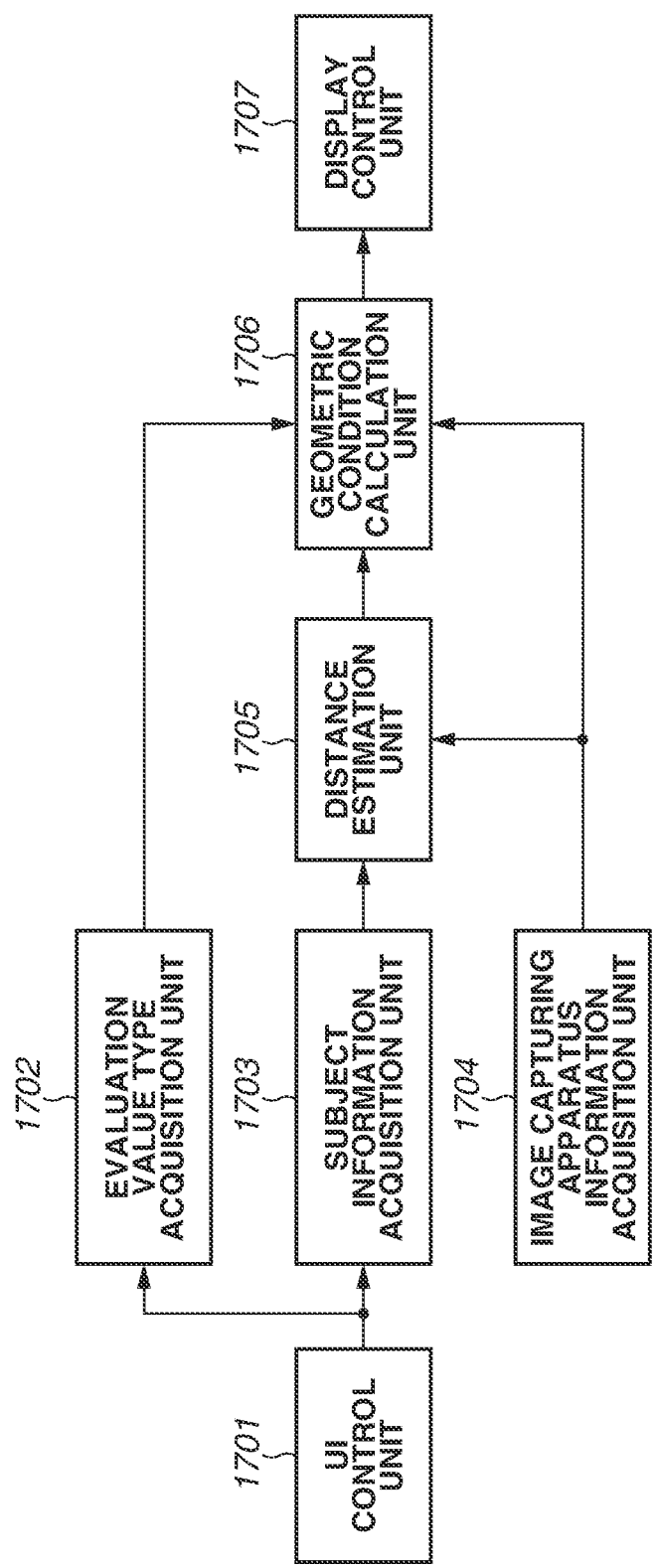
FIG. 17 is a block diagram illustrating an example of a functional configuration of an image processing apparatus.

An example of a functional configuration of the image processing apparatus 1 according to the present exemplary embodiment will be described below with reference to FIG. 17. The image processing apparatus 1 includes a UI control unit 1701, an evaluation value type acquisition unit 1702, a subject information acquisition unit 1703, an image capturing apparatus information acquisition unit 1704, a distance estimation unit 1705, a geometric condition calculation unit 1706, and a display control unit 1707. The UI control unit 1701, the evaluation value type acquisition unit 1702, and the subject information acquisition unit 1703 are substantially similar to the UI control unit 501, the evaluation value type acquisition unit 502, and the subject information acquisition unit 503 in FIG. 5. Further, the image capturing apparatus information acquisition unit 1704 and the display control unit 1707 are substantially similar to the image capturing apparatus information acquisition unit 505 and the display control unit 507 in FIG. 5. Thus, detailed descriptions of the foregoing components are omitted.

The distance estimation unit 1705 estimates a current image capturing distance based on the subject information and the camera information that are acquired by the image capturing apparatus information acquisition unit 1704 and the subject information acquisition unit 1703, and outputs image capturing distance information based on the estimation result to the geometric condition calculation unit 1706.

The geometric condition calculation unit 1706 calculates a geometric condition for calculating a target surface quality evaluation value based on the camera information acquired by the image capturing apparatus information acquisition unit 1704 and the image capturing distance information output from the distance estimation unit 1705. Information indicating the calculated geometric condition is output to the display control unit 1707, and the display control unit 1707 displays the output information on the display 415.

(Process)

An example of a process of the image processing apparatus 1 according to the present exemplary embodiment will be described below with reference to FIG. 18, focusing particularly on a process of calculating a geometric condition and displaying guide information based on the calculated geometric condition. Steps S1801 to S1803 and S1804 are substantially similar to steps S601 to S603 and S605 in FIG. 6, so that detailed descriptions thereof are omitted.

In step S1805, the distance estimation unit 1705 estimates a current image capturing distance of the image capturing apparatus based on the subject information acquired in step S1803 and the camera information acquired in step S804. Details of the processing of step S1805 will be described below.

In step S1806, the geometric condition calculation unit 1706 calculates a geometric condition for calculating a target surface quality evaluation value based on the surface quality evaluation value type information acquired in step S1802, the camera information acquired in step S1804, and the distance information acquired in step S1805. Details of the processing of step S1806 will be described below.

In step S1807, the display control unit 1707 displays guide information based on the geometric condition calculated in step S1806 on the display 415.

Figure 19:
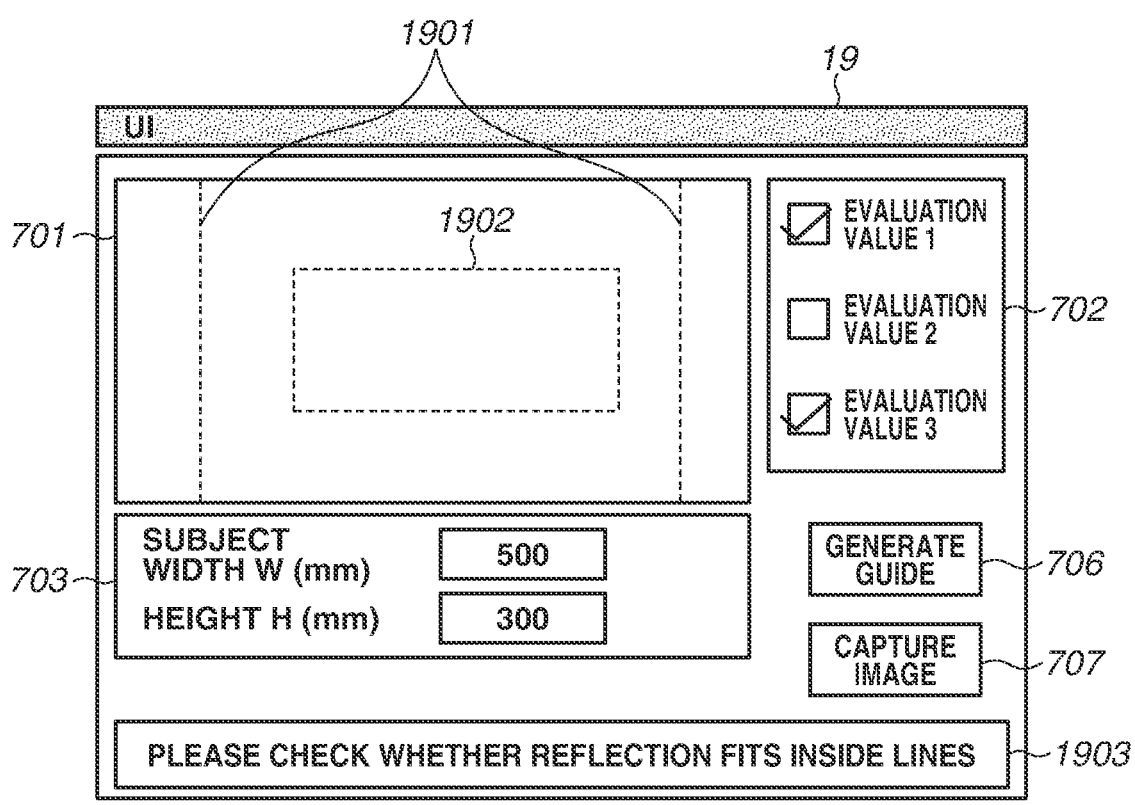
FIG. 19 is a diagram illustrating an example of a GUI.

FIG. 19 illustrates an example of guide information displayed in step S1807. In the example illustrated in FIG. 19, guide information 1901 and guide information 1902 are displayed and superimposed on a preview image in the preview region 701.

The guide information 1901 specified by a broken line is guide information about the image capturing condition for acquiring the spatial frequency component corresponding to the maximum wavelength for use in calculating a surface quality evaluation value. Further, the guide information 1902 specified by a solid line is guide information about the image capturing condition for acquiring the spatial frequency component corresponding to the minimum wavelength. A message display section 1903 is a display region where a message indicating various instructions to the user is displayed. In the example illustrated in FIG. 19, an instruction to the user on the image capturing distance for acquiring the spatial frequency component corresponding to the maximum wavelength is displayed in the message display section 1903. Specifically, a message that prompts the user to check whether the illumination image fits in the interval specified by the two pieces of guide information 1902 is displayed in the message display section 1903.

(Image Capturing Distance Estimation Process)

Figure 20:
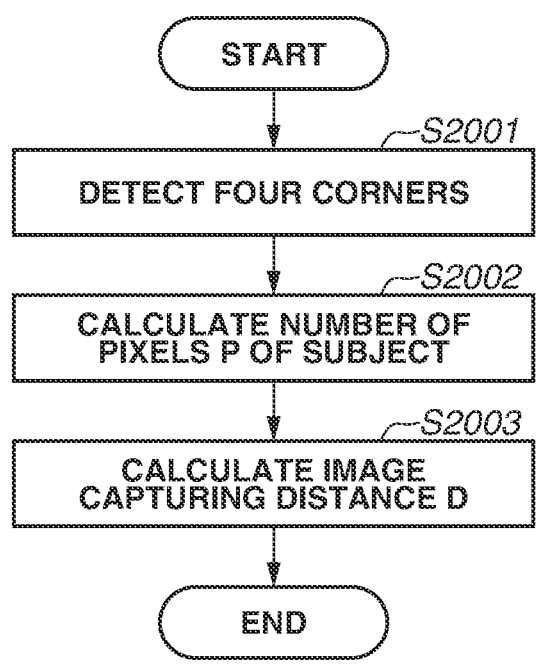
FIG. 20 is a flowchart illustrating an example of a process of an image processing apparatus.

Details of the image capturing distance estimation process described above as the processing of step S1805 in FIG. 18 will be described below with reference to FIG. 20.

In step S2001, the distance estimation unit 1705 detects edges from preview image information and calculates coordinates P1(x1, y1), P2(x2, y2), P3(x3, y3), and P4(x4, y4) of four corners of the subject on the image based on intersection points where the edges intersect. According to the present exemplary embodiment, for convenience, the relationships "x1, x3<x2, x4" and "y1, y2<y3, y4" are satisfied with the upper left point of the preview image being the origin point. Further, since a publicly-known technique can be used in detecting edges from the image, detailed descriptions thereof are omitted.

In step S2002, the distance estimation unit 1705 calculates the number of pixels P of the subject based on the following conditional expression referred to as "formula 10".

$$P = x2 - x1 \quad \text{(formula 10)}.$$

In step S2003, the distance estimation unit 1705 calculates a current the image capturing distance D based on information about the number of pixels P calculated in step S2002 and information about the angle of view θ and the number of horizontal pixels Pn of the image capturing apparatus that are acquired in step 1804. The image capturing distance D is calculated based on the following conditional expression referred to as "formula 11".

$$D = W*Pn(2*P*\tan(\theta/2)) \quad \text{(formula 11)}.$$

(Geometric Condition Calculation Process)

Figure 21:
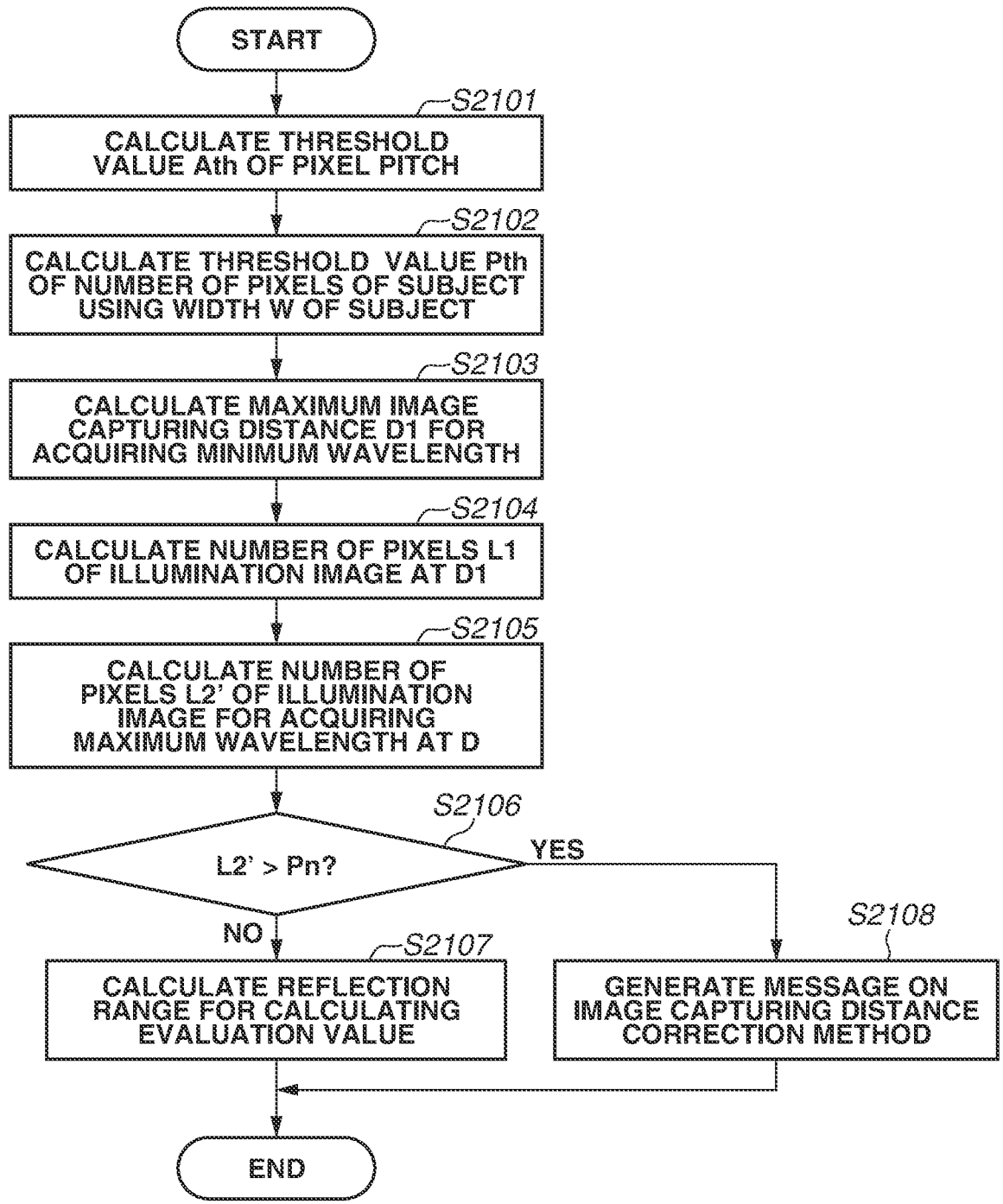
FIG. 21 is a flowchart illustrating an example of a process of an image processing apparatus.

Details of the geometric condition calculation process described above as the processing of step S1806 in FIG. 18 will be described below with reference to FIG. 21. Steps S2101 to S2103 are substantially similar to steps S1001 to S1003 in FIG. 10, so that detailed descriptions thereof are omitted.

Figure 13:
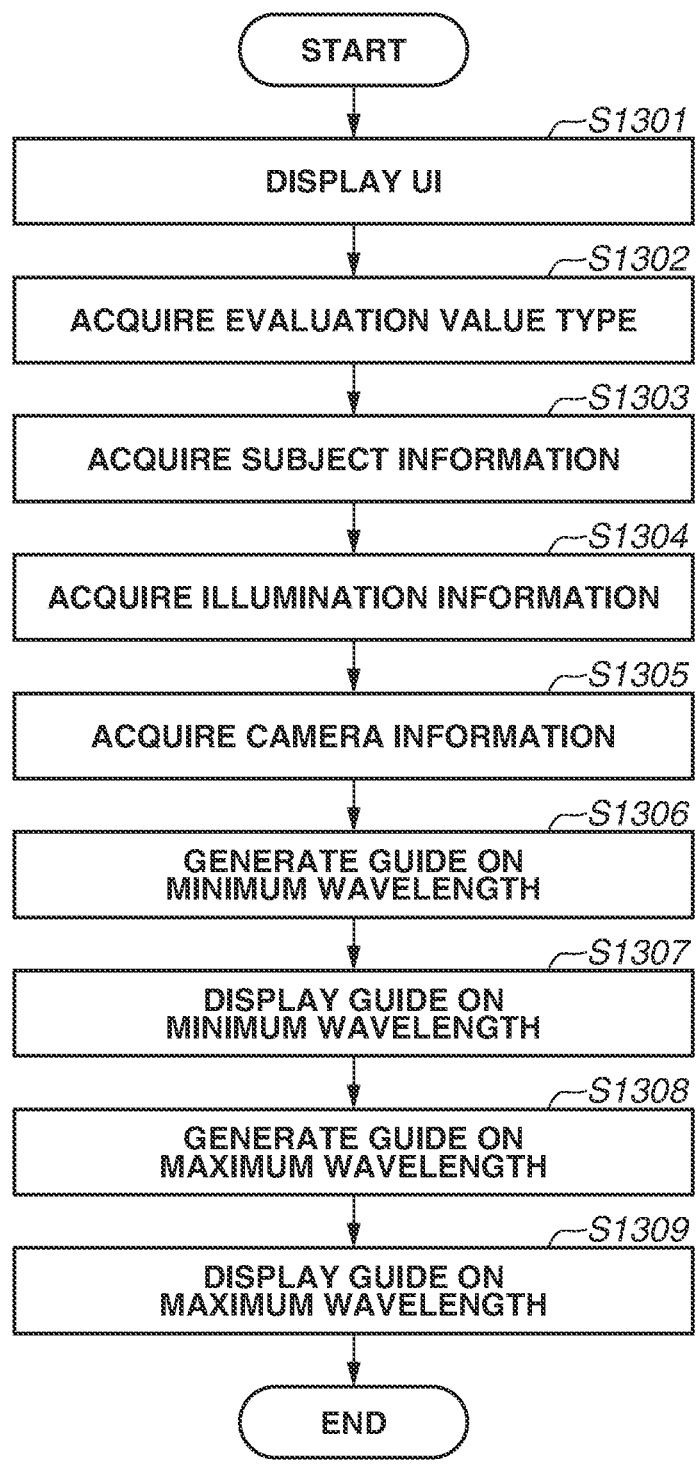
FIG. 13 is a flowchart illustrating an example of a process of an image processing apparatus.

In step S2104, the geometric condition calculation unit 1706 calculates an image capturing condition for acquiring the spatial frequency component corresponding to the minimum wavelength through a process as in step S1306 in FIG. 13 and calculates the threshold value Pth of the subject width and the threshold value Pth' of the subject height. The threshold values Pth and Pth' correspond to the width and height of the region specified by the guide information 1902 in the example illustrated in FIG. 19.

In step S2105, the geometric condition calculation unit 1706 calculates the number of pixels L2' of the illumination image for acquiring the spatial frequency component corresponding to the maximum wavelength at the image capturing distance D. The number of pixels L2' of the illumination image is calculated based on the following conditional expression referred to as "formula 12".

$$L2' = Lth*Pn/(2*D*\tan(\theta/2)) \quad \text{(formula 12)}.$$

In step S2106, the geometric condition calculation unit 1706 compares the magnitude relationship between the number of pixels L2' of the illumination image that is calculated in step S2105 and the number of horizontal pixels Pn of the image capturing apparatus.

Figure 23:
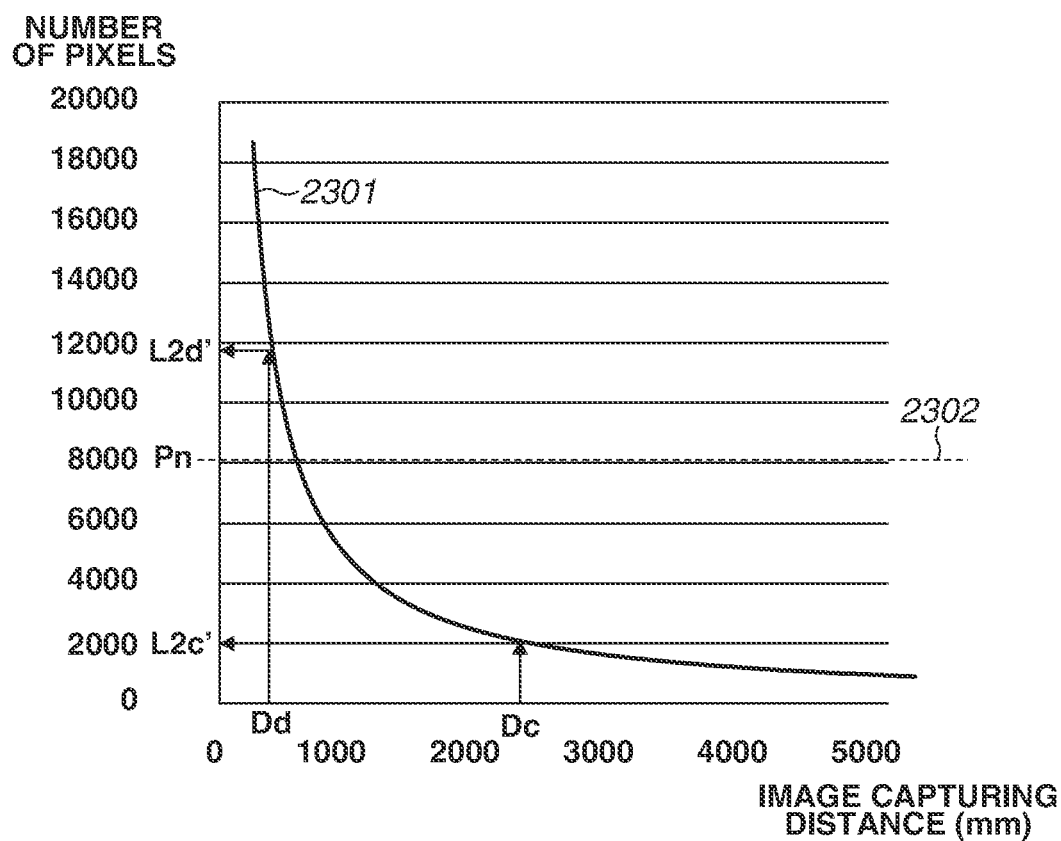
FIG. 23 is a schematic diagram illustrating an example of a relationship between the number of pixels of an illumination image and an image capturing distance.

The processing of step S2106 will be described in more detail below with reference to FIG. 23. FIG. 23 is a schematic diagram illustrating an example of a relationship between the number of pixels of the illumination image for acquiring the spatial frequency component corresponding to the maximum wavelength and the image capturing distance.

In FIG. 23, a graph 2301 illustrates an example of a relationship between the number of pixels of the illumination image for acquiring the spatial frequency component corresponding to the maximum wavelength and the image capturing distance.

Figure 18:
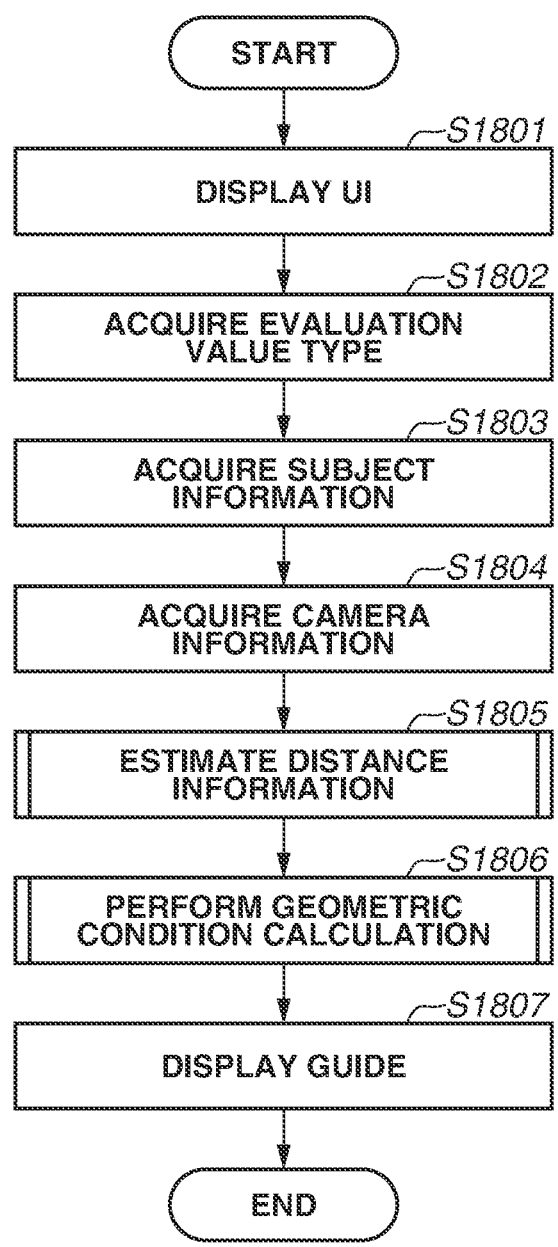
FIG. 18 is a flowchart illustrating an example of a process of an image processing apparatus.

In the example illustrated in FIG. 23, L2c' is the number of pixels of the illumination image for acquiring the spatial frequency component corresponding to the maximum wavelength calculated in step S2105 in a case where the image capturing distance D calculated in step S1805 in FIG. 18 is Dc in FIG. 23. Further, a graph 2302 specified by a broken line indicates the number of horizontal pixels Pn of the image capturing apparatus. Since the number of pixels L2c' of the illumination image is less than the number of horizontal pixels Pn of the image capturing apparatus, guide information is displayable.

Further, L2d' is the number of pixels of the illumination image for acquiring the spatial frequency component corresponding to the maximum wavelength calculated in step S2105 in a case where the image capturing distance D calculated in step S1805 in FIG. 18 is Dd in FIG. 23. Since the number of pixels L2d' of the illumination image is greater than the number of horizontal pixels Pn of the image capturing apparatus, guide information exceeds a range that can be displayed by the display control unit 1707 at the image capturing distance, so that it becomes difficult to display the guide information.

In step S2106, the geometric condition calculation unit 1706 compares the magnitude relationship between the number of pixels L2' of the illumination image calculated in step S2105 and the number of horizontal pixels Pn of the image capturing apparatus in order to determine whether the number of pixels necessary to display the guide information exceeds the display range.

In step S2106, in a case where the geometric condition calculation unit 1706 determines that the number of pixels L2' of the illumination image is less than or equal to the number of horizontal pixels Pn of the image capturing apparatus (NO in step S2106), the processing proceeds to step S2107. Step S2107 is substantially similar to step S1008 in FIG. 10, so that detailed descriptions thereof are omitted.

On the other hand, in step S2106, in a case where the geometric condition calculation unit 1706 determines that the number of pixels L2' of the illumination image is greater than the number of horizontal pixels Pn of the image capturing apparatus (YES in step S2106), the processing proceeds to step S2108.

In step S2108, the geometric condition calculation unit 1706 determines that the number of pixels necessary to display the guide information exceeds the display range, and generates a message about an image capturing distance correction method. Specifically, the geometric condition calculation unit 1706 determines that it is difficult to generate guide information about the illumination image at the image capturing distance D, and notifies the user of a message that prompts the user to make an adjustment to increase the image capturing distance.

Guide information is generated based on current distance information through the foregoing process. This makes it possible to provide the user with image capturing information for calculating a target surface quality evaluation value without acquiring illumination information.

While a case where the distance information estimation is performed based on subject information is described above as an example according to the present exemplary embodiment, any methods for estimating current distance information can be used and are not particularly limited. As a specific example, information indicating a correspondence relationship between an in-focus plane and the image capturing distance can be held in advance to estimate the distance between the subject and the image capturing apparatus based on in-focus information in imaging. Further, as another example, the distance information acquisition can be performed using a so-called distance measurement sensor such as a time-of-flight (ToF) sensor.

Further, while a case where whether the guide information for acquiring the spatial frequency component corresponding to the maximum wavelength exceeds the display range is determined by performing a comparison with the number of pixels of the image capturing apparatus is described above as an example according to the present exemplary embodiment, the number of pixels of the subject can be used instead of the number of pixels of the image capturing apparatus. In this case, since the number of pixels of the subject changes with the image capturing distance as described above, the magnitude relationship between the number of pixels of the subject at the image capturing distance and the number of pixels necessary to display the guide information is compared.

With the present disclosure, an evaluation value for evaluating an object surface state is calculated in a more suitable form.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-063426, filed Apr. 6, 2022, which is hereby incorporated by reference herein in its entirety.

What is claimed is:

1. An image processing apparatus comprising:
   a distance information acquisition unit configured to acquire distance information about a distance between a subject illuminated with light from a light source and an image capturing apparatus configured to image the subject;
   an image capturing apparatus information acquisition unit configured to acquire image capturing apparatus information about the image capturing apparatus;
   a geometric condition calculation unit configured to calculate a geometric condition on a positional relationship between the light source, the subject, and the image capturing apparatus based on the distance information and the image capturing apparatus information; and
   a display control unit configured to display guide information on the calculated geometric condition in a display region.

2. The image processing apparatus according to claim 1, wherein the geometric condition includes a predetermined spatial frequency component in an image acquired by imaging the subject.

3. The image processing apparatus according to claim 1, wherein the distance information is calculated based on size information about the subject.

4. The image processing apparatus according to claim 1, wherein the image capturing apparatus information includes one or more of (a) information about the number of pixels of the image capturing apparatus in one or more of a horizontal direction and a vertical direction, and (b) information about an angle of view of the image capturing apparatus, and information about a focal length during the imaging.

5. The image processing apparatus according to claim 1, wherein an evaluation value for evaluating a surface state of the subject is calculated based on an image acquired by imaging the subject.

6. The image processing apparatus according to claim 5, wherein the evaluation value is an evaluation value calculated based on a distortion of an illumination image reflected on the subject and is calculated for each spatial frequency component.

7. The image processing apparatus according to claim 1, wherein the geometric condition is one or more of a condition for including a spatial frequency component corresponding to a minimum wavelength in a wavelength width set by a user in an image acquired by imaging the subject and a condition for including a spatial frequency component corresponding to a maximum wavelength in the wavelength width in the image acquired by imaging the subject.

8. The image processing apparatus according to claim 7, wherein the guide information includes information indicating a size range of an illumination image on the subject.

9. The image processing apparatus according to claim 7, wherein the guide information includes information indicating a size range of the subject.

10. The image processing apparatus according to claim 7, wherein the display control unit displays information indicating a size range of the subject as the guide information for including the spatial frequency component corresponding to the minimum wavelength in the image, and
    wherein the display control unit displays information indicating a size range of an illumination image on the subject as the guide information for including the spatial frequency component corresponding to the maximum wavelength in the image.

11. The image processing apparatus according to claim 7, wherein in a case where the condition for including the spatial frequency component corresponding to the minimum wavelength in the image and the condition for including the spatial frequency component corresponding to the maximum wavelength in the image are incompatible, the display control unit displays information about a method of correcting an illumination condition corresponding to the light source.

12. The image processing apparatus according to claim 7, wherein the geometric condition calculation unit generates information about the number of pixels of an illumination image for including the spatial frequency component corresponding to the maximum wavelength at the distance between the subject and the image capturing apparatus in the image.

13. A method for controlling an image processing apparatus, the method comprising:
    acquiring distance information about a distance between a subject illuminated with light from a light source and an image capturing apparatus configured to image the subject;
    acquiring image capturing apparatus information about the image capturing apparatus;
    calculating a geometric condition on a positional relationship between the light source, the subject, and the image capturing apparatus based on the distance information and the image capturing apparatus information; and
    displaying guide information on the calculated geometric condition in a display region.

14. A non-transitory computer-readable storage medium storing instructions that, when executed by a computer, cause the computer to perform an image processing method, the image processing method comprising:
    acquiring distance information about a distance between a subject illuminated with light from a light source and an image capturing apparatus configured to image the subject;
    acquiring image capturing apparatus information about the image capturing apparatus;
    calculating a geometric condition on a positional relationship between the light source, the subject, and the image capturing apparatus based on the distance information and the image capturing apparatus information; and
    displaying guide information on the calculated geometric condition in a display region.

* * * * *